(12) United States Patent
Duggal

(10) Patent No.: US 12,160,197 B1
(45) Date of Patent: Dec. 3, 2024

(54) 1KW-100KW WIND-RESISTANT PHOTOVOLTAIC MODULES AND STRUCTURES

(71) Applicant: Vijay Duggal, Elmhurst, NY (US)

(72) Inventor: Vijay Duggal, Elmhurst, NY (US)

(73) Assignee: INNOTECT, Elmhurst, NY (US)

( * ) Notice: Subject to any disclaimer, the term of this patent is extended or adjusted under 35 U.S.C. 154(b) by 151 days.

(21) Appl. No.: 17/883,566

(22) Filed: Aug. 8, 2022

Related U.S. Application Data

(63) Continuation-in-part of application No. 17/079,067, filed on Oct. 23, 2020, now Pat. No. 11,411,526.

(51) Int. Cl.
*H02S 20/20* (2014.01)
*H02S 20/10* (2014.01)
*H02S 30/10* (2014.01)
*H02S 40/34* (2014.01)
*H02S 40/42* (2014.01)

(52) U.S. Cl.
CPC .............. *H02S 30/10* (2014.12); *H02S 20/10* (2014.12); *H02S 40/34* (2014.12); *H02S 40/425* (2014.12)

(58) Field of Classification Search
CPC ................................. H02S 20/20; H02S 20/21
See application file for complete search history.

(56) References Cited

U.S. PATENT DOCUMENTS

| | | | | |
|---|---|---|---|---|
| 9,221,136 B2 * | 12/2015 | Ansari | ..................... | B23P 19/04 |
| 9,612,039 B2 * | 4/2017 | Meppelink | ............ | F24S 30/455 |
| 10,727,778 B2 * | 7/2020 | Carrington | .............. | H02S 10/40 |
| 10,826,426 B1 * | 11/2020 | Tyler | ........................ | H02S 30/10 |
| 11,108,354 B2 * | 8/2021 | Carrington | .............. | H02S 30/20 |
| 2004/0124711 A1 * | 7/2004 | Muchow | ................. | F24S 25/10 |
| | | | | 307/64 |
| 2006/0137348 A1 * | 6/2006 | Pas | .......................... | F03D 9/19 |
| | | | | 60/641.1 |
| 2008/0137327 A1 * | 6/2008 | Hodulik | .................. | F21S 8/086 |
| | | | | 362/183 |

(Continued)

FOREIGN PATENT DOCUMENTS

| | | | | |
|---|---|---|---|---|
| CH | 706951 A2 * | 3/2014 | ............. | H02S 20/10 |
| CN | 103856151 A * | 6/2014 | ............. | F03D 9/007 |

(Continued)

OTHER PUBLICATIONS

Website Atlantic Coast Containers. Available at https://accontainer.com/our-containers/standard-containers/mini-shipping-containers/. Available at web.archive.org as early as Apr. 6, 2019 (Year: 2019).*

(Continued)

*Primary Examiner* — Adi Amrany

(57) ABSTRACT

The present invention relates to 1 kW-100 kW wind-resistant photovoltaic modules and structures that can be utilized as part of an infrastructure energy generation system or for a stand-alone photovoltaic installation. The wind-resistant photovoltaic modules are comprised of hollow structural enclosures formed by solar panels, walls, rigid panels or perforated panels configured to reduce wind loads on solar panels, enable heat dissipation produced by solar panels and to protect electrical circuits and switchgear for the solar panels. The photovoltaic modules are also configured to enable rainwater management.

29 Claims, 30 Drawing Sheets

(56) References Cited

U.S. PATENT DOCUMENTS

| | | | | |
|---|---|---|---|---|
| 2008/0149403 | A1* | 6/2008 | Fein | F03D 9/11 180/2.2 |
| 2008/0154801 | A1* | 6/2008 | Fein | G06Q 50/06 60/641.2 |
| 2009/0195077 | A1* | 8/2009 | Blumenthal | H02S 10/10 290/1 R |
| 2010/0114356 | A1* | 5/2010 | Schmitt | G06F 1/20 700/117 |
| 2010/0200041 | A1* | 8/2010 | Dearborn | B60L 8/003 136/244 |
| 2010/0327657 | A1* | 12/2010 | Kuran | H02J 3/38 307/43 |
| 2011/0017256 | A1* | 1/2011 | Stevens | H02S 20/00 136/244 |
| 2011/0023867 | A1* | 2/2011 | Muchow | F24S 30/455 126/623 |
| 2011/0047931 | A1* | 3/2011 | Wallgren | F24S 25/13 52/745.19 |
| 2011/0146751 | A1* | 6/2011 | McGuire | F03D 9/007 136/245 |
| 2012/0211046 | A1* | 8/2012 | Smyth | H02J 3/381 136/244 |
| 2012/0280570 | A1* | 11/2012 | Smythe | H02G 7/00 307/69 |
| 2013/0314255 | A1* | 11/2013 | BEnn | E01F 9/688 340/908 |
| 2014/0020320 | A1* | 1/2014 | Parkes | E01C 11/14 52/396.05 |
| 2014/0096463 | A1* | 4/2014 | Prentice | E04D 3/405 52/173.3 |
| 2014/0238467 | A1* | 8/2014 | Martin | H02S 40/38 136/246 |
| 2014/0246903 | A1* | 9/2014 | Romeo | E04H 6/025 307/11 |
| 2015/0077979 | A1* | 3/2015 | Namors | F21L 4/08 362/153.1 |
| 2015/0122333 | A1* | 5/2015 | Kitano | H02S 20/10 136/259 |
| 2015/0136208 | A1* | 5/2015 | Park | F24S 25/617 136/251 |
| 2015/0222226 | A1* | 8/2015 | Giles | F24S 25/50 29/525.01 |
| 2016/0141437 | A1* | 5/2016 | Asbeck | H02S 40/22 136/246 |
| 2017/0040933 | A1* | 2/2017 | Vogel | H02S 40/36 |
| 2017/0093328 | A1* | 3/2017 | Wylie | H02S 40/12 |
| 2017/0129697 | A1* | 5/2017 | Reynard | B65D 90/0013 |
| 2017/0202155 | A1* | 7/2017 | Iwai | E04B 7/18 |
| 2018/0254736 | A1* | 9/2018 | Duggal | F03D 9/007 |
| 2019/0386601 | A1* | 12/2019 | Keller | E04H 6/025 |
| 2020/0119683 | A1* | 4/2020 | Milder | H02S 10/10 |
| 2022/0018114 | A1* | 1/2022 | Akagawa | F03D 13/40 |

FOREIGN PATENT DOCUMENTS

| | | | |
|---|---|---|---|
| CN | 206490625 U | * 9/2017 | |
| CN | 109873445 A | * 6/2019 | |
| WO | WO-2010123929 A1 | * 10/2010 | E04H 6/025 |

OTHER PUBLICATIONS

Website Container Container. Available at https://www.containercontainer.com/containers/6ft-new-build-container/. Available at web.archive.org as early as Nov. 2020 (Year: 2020).*

Webiste Shipping Busiess. Available at shipsbusiness.com/container-types.html. Available at web.archive.org as early as 2018 ( Year: 2018).*

* cited by examiner www.innotect.net/duggal © @ArchitectDugg

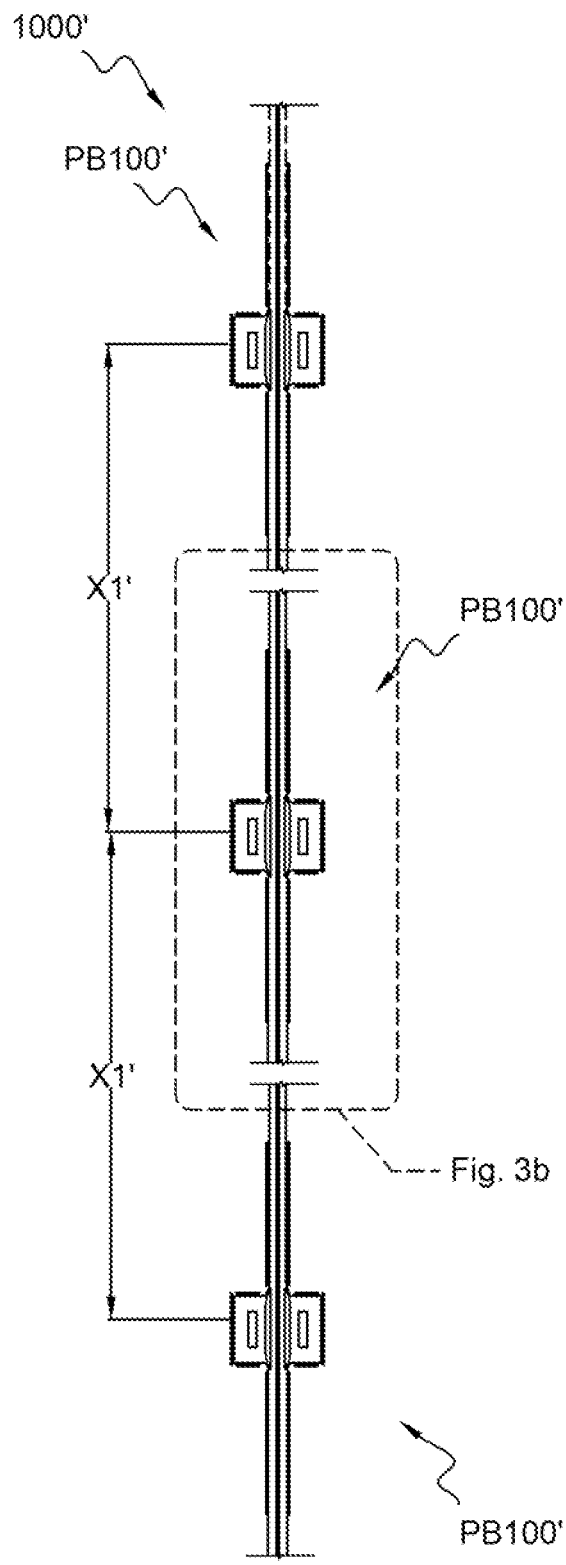
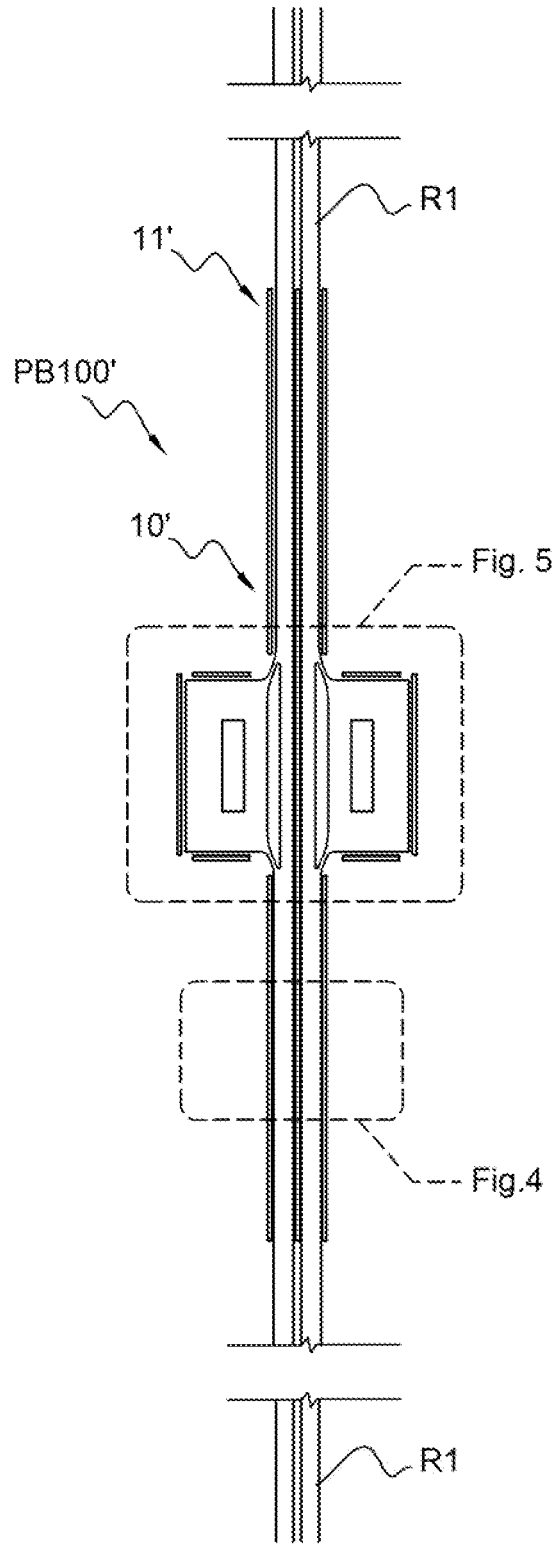
FIG. 3a
FIG. 3b www.innotect.net/duggal © @ArchitectDugg

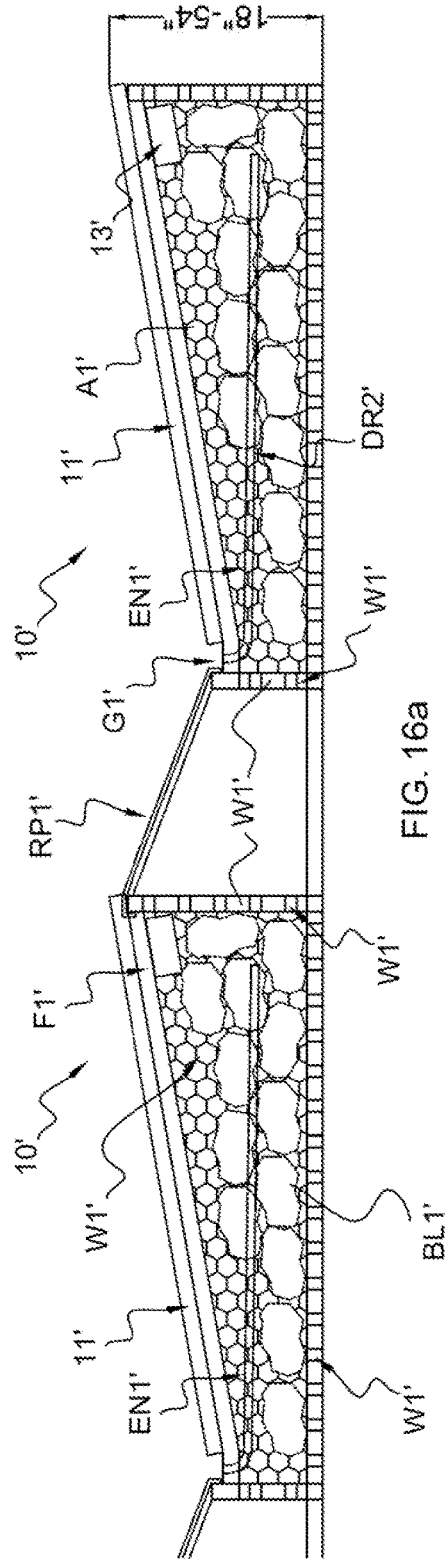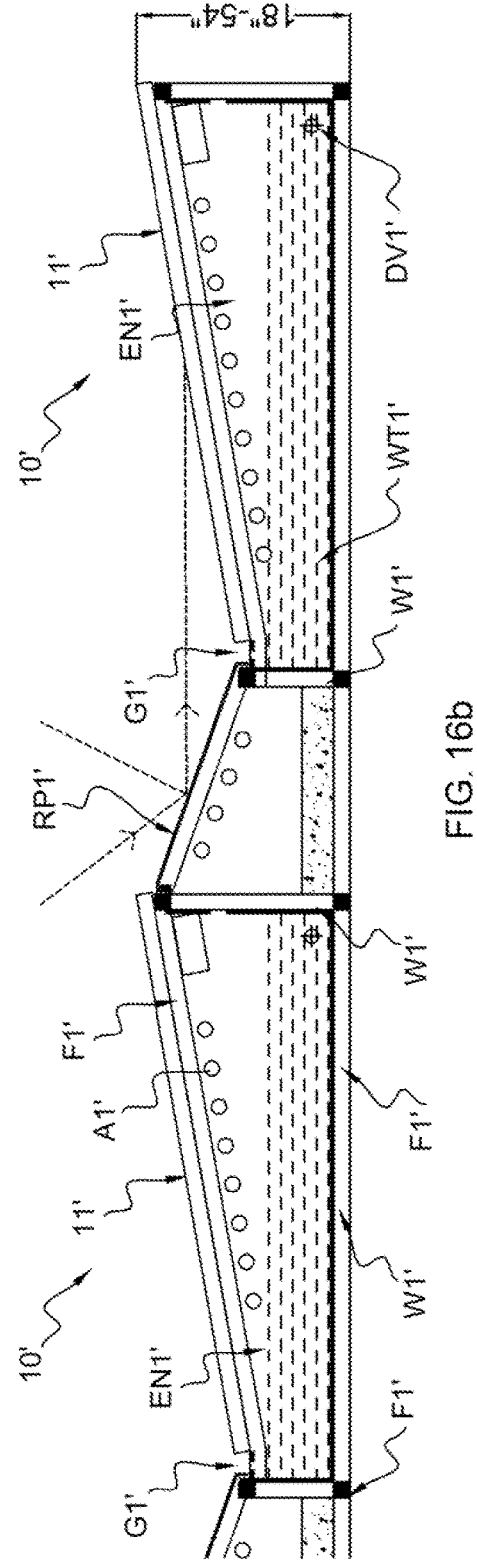
FIG. 16a
FIG. 16b

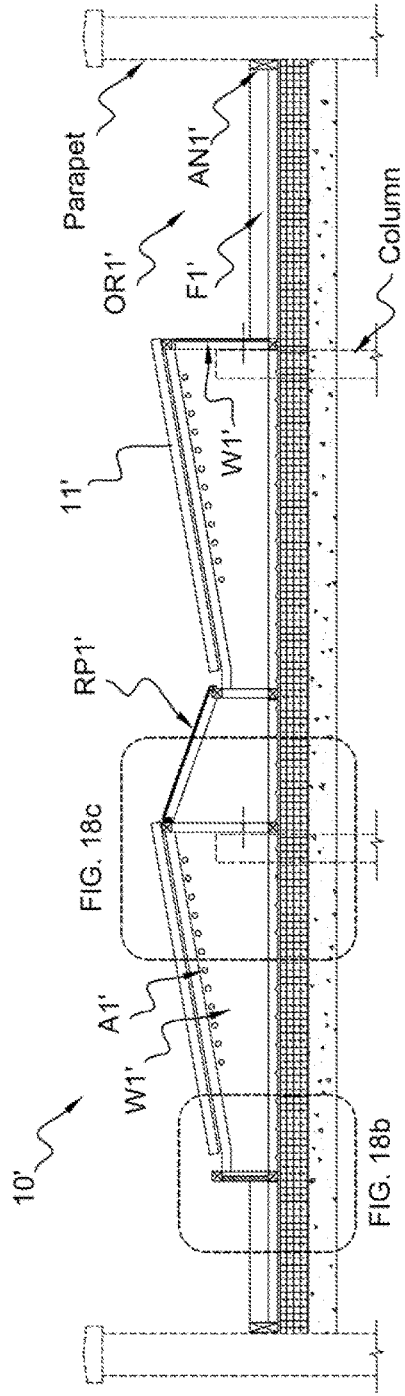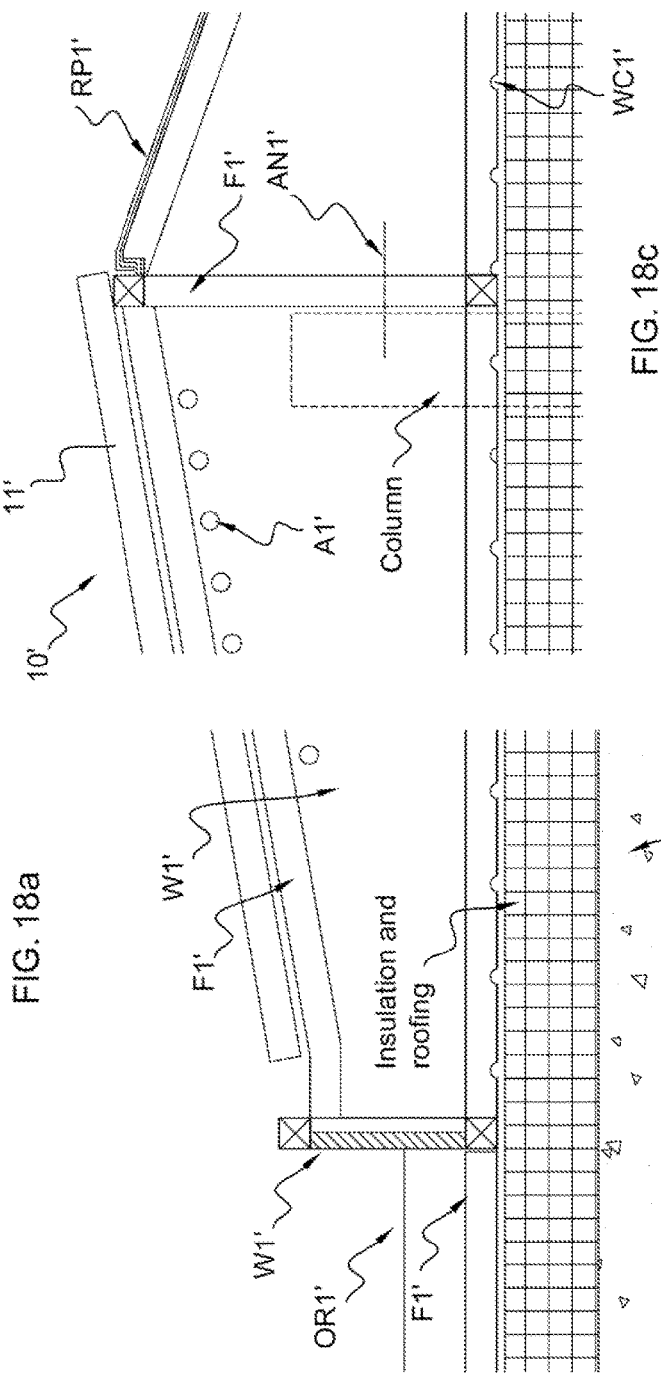
FIG. 18a
FIG. 18b
FIG. 18c www.innotect.net/duggal © @ArchitectDugg

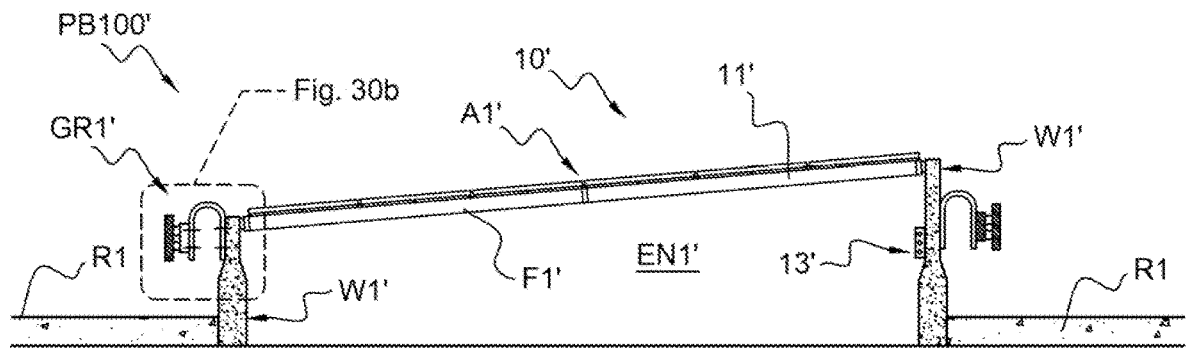
FIG. 30a
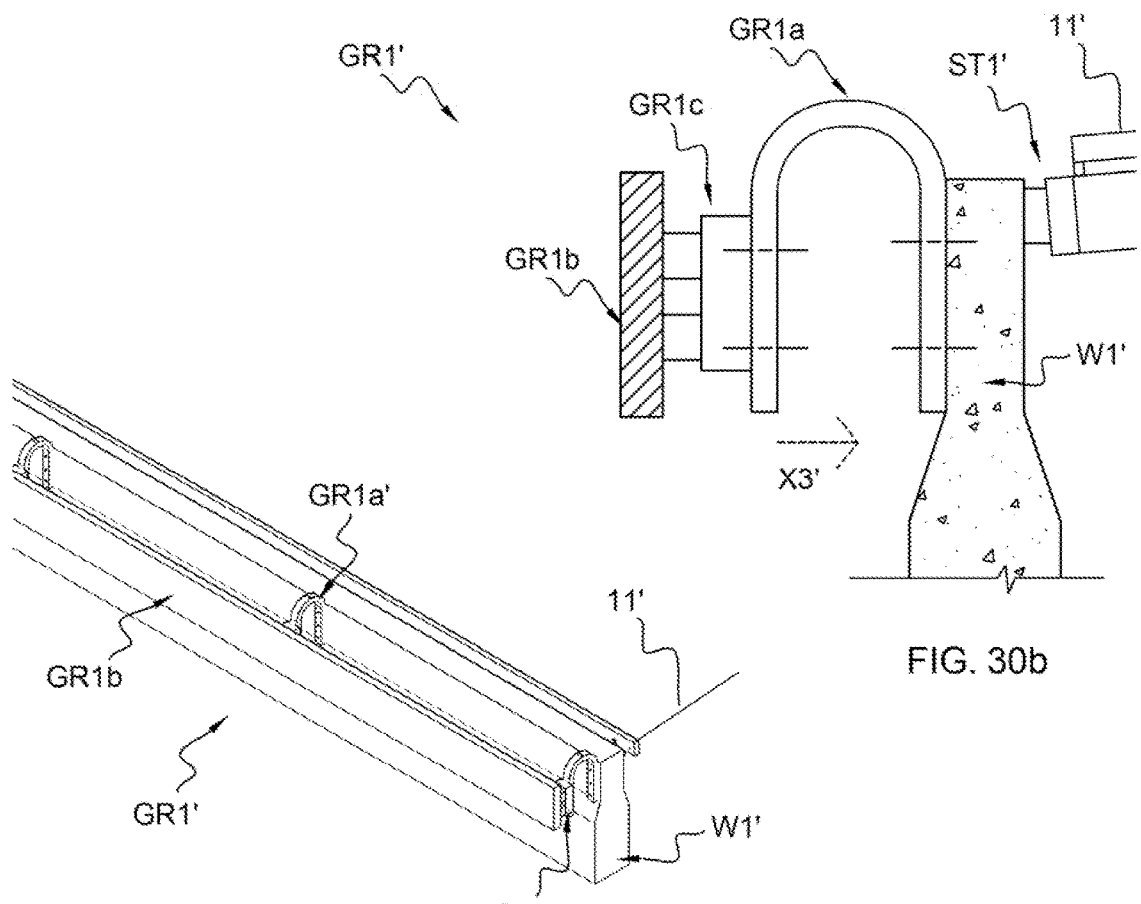
FIG. 30b
FIG. 30c

1KW-100KW WIND-RESISTANT PHOTOVOLTAIC MODULES AND STRUCTURES

CROSS-REFERENCE TO RELATED APPLICATIONS

The present application is a continuation-in-part of patent U.S. Ser. No. 11/411,526 the contents of which are are incorporated into the present application by reference.

TECHNICAL FIELD

The present invention relates to 1 kW-100 kW wind-resistant photovoltaic modules and structures that can be utilized as part of an infrastructure energy generation system or for a stand-alone photovoltaic installation. The wind-resistant photovoltaic modules are comprised of hollow structural enclosures formed by solar panels, walls, rigid panels or perforated panels configured to reduce wind loads on solar panels, enable heat dissipation produced by solar panels and to protect electrical circuits and switchgear for the solar panels. The photovoltaic modules are also configured to enable rainwater management.

BACKGROUND OF THE INVENTION

Wind damage, snow damage, vandalism, electrocution risks, land costs for solar installations, electrical transmission losses from solar installations, electric grid installation costs and damage to solar panels due to vehicular impacts are important factors in determining safe and economical installation of solar panels. Rainwater management from solar installations poses additional environment risks. The present invention solves these problems as follows:

Conventional solar installations are comprised of inclined walls (FIG. 1x) or canopy-like structures (FIG. 1y). As these structures are open to below and sides, they are subjected to wind damage in heavy winds and storms. FIGS. 1x, 1y schematically depict wind loads with dashed curves indicating how positive (+) and negative (−) wind pressures from below and top can uplift and damage the solar panels. Solar panels are generally rated for wind loads: 62 psf, 3000 Pa (305 kg/m$^2$) back side; and for snow: 125 psf, 6000 Pa, (611 kg/m$^2$) front side. It has been observed that these ratings are not sufficient against heavy winds and storms. The present invention solves this problem by enclosing the sides of photovoltaic modules with walls or rigid panels, and by incorporating pressure equalization means to reduce wind loads on solar panels from 10%-90% thereby making the photovoltaic installations wind-resistant.

The present invention discloses means to reduce electrocution and vandalism risks by enclosing the backside and/or underside of the solar panels with the pressure equalized photovoltaic enclosures. These enclosures enable to conceal some of the necessary switchgear and electrical transmission lines within the photovoltaic enclosure providing weather protection as well as safety.

To minimize land costs for the solar installations, to minimize electrical transmission losses and to minimize electrical distribution costs, the present invention discloses photovoltaic power banks (PB100') adjacent to roads, train tracks or linear boundaries. The present invention discloses various configurations of photovoltaic power banks to power electric vehicles without the need for long distance electrical transmission lines thereby reducing installation costs and electrical transmission losses.

In one embodiment of the invention the present invention provides means to collect rainwater fallen on solar panels for storage, irrigation or for stormwater management.

The disclosed wind-resistant photovoltaic modules and structures can be utilized for utility scale solar farms, as stand-alone installations as well as ballasted rooftop systems.

DESCRIPTION OF RELATED ART

Refer to patent U.S. Ser. No. 11/411,526 by the author of the present invention.

BRIEF SUMMARY OF THE INVENTION

It is object of the present invention to reduce at least 10% wind loads on solar panels (arrays) by enclosing the solar arrays with traffic barriers, walls, rigid panels, louvers, grills and/or perforated panels, and by providing apertures within the enclosure for heat dissipation. The wind-resistant photovoltaic modules are comprised of solar panels and hollow structural enclosures EN1' that are substantially enclosed from all sides with walls, rigid panels, louvered panels or metallic grills supporting solar arrays 11' facing one or more sunward directions with structural frames. The walls are configured to divert winds imposed on the solar panels from below and/or from sides to reduce wind loads on solar panels by at least 10%. The enclosure formed by solar panels and walls is comprised of predetermined apertures configured to reduce wind loads on solar panels by pressure equalization as well as to provide natural ventilation for the solar panels to allow heat dissipation produced by solar panels. The wind-resistant photovoltaic modules/structures are configured to provide an overall reduction of wind loads by at least 10%.

The disclosed photovoltaic modules and structures can be placed along roads, train tracks, linear boundaries or they can utilized for solar farms, within farmlands, used as area dividers, roof installations or within properties in any configuration.

In one embodiment of the invention photovoltaic modules 10' are pressure-equalized for atmospheric pressure equalization by using a plurality apertures A1' and are substantially enclosed from all sides to reduce wind loads on the photovoltaic modules while allowing ventilation behind the solar panels. In one embodiment of the invention the disclosed wind-resistant photovoltaic modules are configured to enable rainwater collection or stormwater management. In one embodiment of the invention the disclosed wind-resistant photovoltaic modules and structures are comprised of structural isolation joints and movement joints to prevent damage to solar panels from vehicular impacts.

It is an object of the present invention to provide photovoltaic power banks (PB100') along a network of roads and trains to facilitate carbon-neutral transportation while reducing land costs and electrical transmission losses.

These objectives are achieved by utilizing the spaces alongside shoulders of roads, medians of roads, the spaces in between the train tracks as well as the spaces alongside train tracks for clean energy production. The present invention utilizes elongated photovoltaic structures and modules that are adapted to the configuration of transportation routes and liner boundaries (FIGS. 2a-13b). The 1 kW-100 kW electrical capacity of the disclosed photovoltaic modules and structures is provided only as a references; the disclosed modules and structures can be configured for any other electrical capacity; they can be combined to form utility scale solar installations.

It is an object of the present invention to enable unobstructed views for the drivers and travelers along highways and train tracks. In one embodiment of the invention this is achieved by keeping height of the disclosed photovoltaic structures low, for example between 30"-54" (FIGS. 2a-13b).

It is an object of the present invention to enable stormwater management while generating clean energy. The present invention provides means for retention or detention of rainwater fallen on the solar panels. The term 'detention' refers to temporarily holding of rainwater after a rain event to prevent overwhelming of sewers and then releasing it at a gradual rate. This is mandated in many jurisdictions such as New York City. The term 'retention' refers to storage of rainwater. In one embodiment of the invention the disclosed wind-resistant photovoltaic modules and structures are comprised of rainwater gutters and/or water storage tanks. (FIGS. 2a-21c).

It is an object of the present invention to utilize elongated and enclosed photovoltaic modules/structures 10' as a means to define or secure boundaries (FIGS. 2a-13b). This is achieved by interconnecting photovoltaic modules 10' in a row formation. Photovoltaic modules 10' are comprised of lockable structural interconnections to attach them with one another or attach them to ground to form a barrier. The lockable structural interconnections are known in the art, hence they are not described here. The height of the disclosed wind-resistant photovoltaic modules/structures can be, for example, up to 8 feet to form a boundary wall or an area divider.

It is an object of the present invention to prevent electrocution and vandalism risks. This is achieved by concealing electrical switchgear for the solar panels and transmission lines within the hollow structural enclosures EN1' of photovoltaic modules 10'. Hollow structural enclosures EN1' are secured to the ground by using concealed structural fasteners preferably located within the interior side of the enclosures to prevent vandalism. Photovoltaic modules 10' are comprised of lockable structural fasteners for interconnecting them with one another in a straight or curvilinear path.

It is an object of the present invention to enable traffic safety and protection of photovoltaic structures 10' against vehicular impacts. This is achieved by integrating traffic barriers into photovoltaic modules 10'. The walls W1' can be configured as traffic barriers compliant with the size, shape and structural strength requirements of the Federal Highway Administration (FHWA), National Highway Traffic Safety Administration (NHTSA) or Department of Transportation having jurisdiction over the installation. In one embodiment of the invention vehicle impact shock absorbing guard rails are attached to the traffic barriers facing the roadway to enable protection of solar panels against vehicular damage. In another embodiment of the invention the disclosed photovoltaic modules 10' are protected by traffic barriers placed adjacent to photovoltaic modules 10' (FIG. 21b). Traffic barriers TB1' or walls W1' are configured to provide protection against wind loads while protecting solar panels 11' against vehicular impacts.

It is an object of the present invention to maximize solar gains for solar arrays 11'. This is achieved by incorporating different orientations of solar arrays 11' within photovoltaic modules 10' (FIGS. 1a-23b).

It is an object of the present invention to enable ballasted rooftop installations using wind-resistant photovoltaic modules 10'. These modules prevent penetration of the roofing membranes while securing the photovoltaic modules against wind loads. This is achieved by shaping the photovoltaic modules to deflect winds, providing means for pressure equalization and filling the interior of the enclosed photovoltaic structures with ballast (FIGS. 16a-20). In one embodiment of the invention these modules are configured for rainwater detention or retention to enable stormwater management as required by many building codes.

It is an object of the present invention to enable efficient manufacturing and installation of the enclosed photovoltaic installations. This is achieved by making all the components of photovoltaic structures 10' such as walls W1' modular that can be shipped dismantled and erected on site by using structural fasteners or clips CL1'.

It is an object of the present invention to enable electrification of highways and trains for Net-zero transportation. FIGS. 2a-13b illustrate the utilization of wind-resistant photovoltaic structures/modules 10' along highways. FIGS. 24a-27b illustrate the utilization of disclosed wind-resistant structures/modules 10' along train tracks. This is achieved by providing a number of photovoltaic power banks (PB100') along train tracks. The photovoltaic power banks are configured to supply electricity produced by wind-resistant photovoltaic modules 10' to electric vehicles as well as to transportation equipment and facilities.

FIGS. 5, 8, 9, 10 illustrate how the energy produced by the disclosed power banks PB100' along highways can be utilized to supply power to electric vehicle charging ports (CP1') by utilizing vehicle charging zones (CZ1', CZ2') configured along roads. In one embodiment of the invention the roads adjacent to the vehicle charging zones and the areas surrounding the vehicle charging zones are enclosed by photovoltaic structures 10' for space utilization as well as to prevent intrusions into the vehicle charging zones. The vehicle charging zones comprise amenities (AM1') for the travelers to take a relaxed break from driving while the electric vehicles are being charged. The vehicle charging zones are configured to separate commercial vehicle charging zones CZ1' intended for trucks and buses from personal vehicle charging zones CZ2' by locating amenities AM1' in the middle as a divider (FIG. 5).

It is an object of the present invention to reduce inner city pollution by providing solar powered shipping transfer points along transportation routes. This is achieved by providing shipping transfer points and warehouses alongside vehicle charging plazas (FIGS. 8,10). It is an object of the present invention to provide solar powered part-and-ride facilities along highways and train stations. This is achieved by providing electric vehicle charging zones along roads (FIG. 9).

It is an object of the invention to enable property owners to setup their own small-scale solar panel installations in their front yards, backyards, roofs or other empty spaces within their properties (FIGS. 14-20). In one embodiment of the invention photovoltaic modules 10' are plug-and-play units that can be easily set up by individuals unless utility grid connection is required. In one embodiment of the invention the disclosed photovoltaic modules are portable unites that be moved into any position as required. Photovoltaic modules 10' are preferably self-contained hollow modular units configured to electrically connect to an off-grid electrical system, a grid-tied electrical system, a Distributed Energy Resource (DER) or a microgrid.

In one embodiment of the invention wind-resistant photovoltaic modules 10' are configured to store rainwater, divert rainwater or detain rainwater for a predetermined period or time to enable stormwater management.

The author of the present application Vijay Duggal is a registered architect in the United States, licensed in the State of New York. Additional information about the designs disclosed herein can be obtained by contacting him using the following URL: www.innotect.net/duggal. Twitter handle: @ArchitectDugg. All rights for the contents of this application except as noted hereinbefore are reserved by the author.

BRIEF DESCRIPTION OF THE SEVERAL VIEWS OF THE DRAWING

FIG. 3a: Plan view of one embodiment of the invention
FIG. 3b: Plan view of one embodiment of the invention
FIG. 16a: Sectional view of one embodiment of the invention
FIG. 16b: Sectional view of one embodiment of the invention
FIG. 18a: Sectional view of one embodiment of the invention
FIG. 18b: Sectional view of one embodiment of the invention
FIG. 18c: Sectional view of one embodiment of the invention
FIG. 30a: Sectional view of one embodiment of the invention
FIG. 30b: Sectional view of one embodiment of the invention
FIG. 30c: 3D view of one embodiment of the invention

DETAILED DESCRIPTION OF THE INVENTION

Figure 1X:
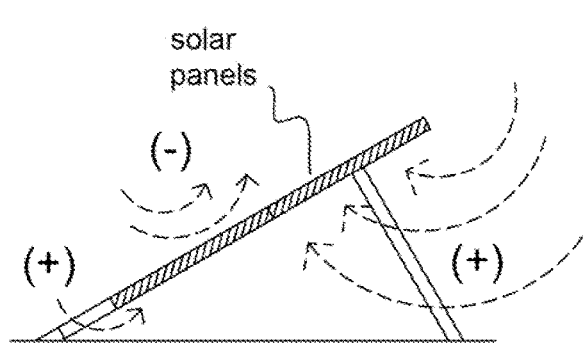
FIG. 1x: Prior art
Figure 1Y:
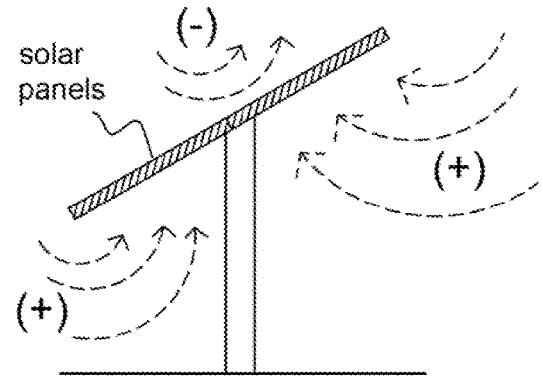
FIG. 1y: Prior art
Figure 1A:
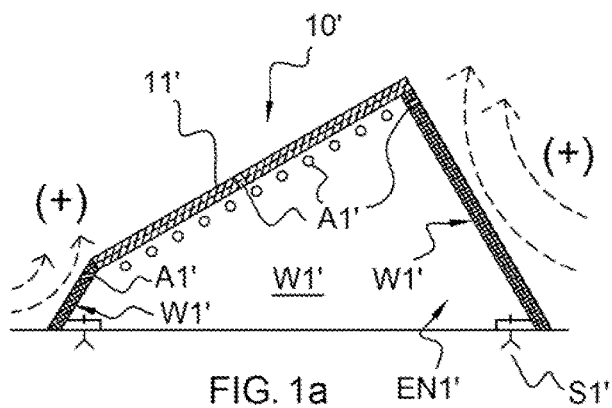
FIG. 1a: Sectional view of one embodiment of the invention
Figure 1B:
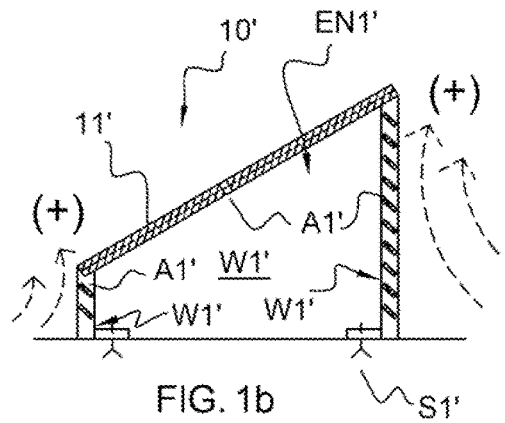
FIG. 1b: Sectional view of one embodiment of the invention
Figure 1C:
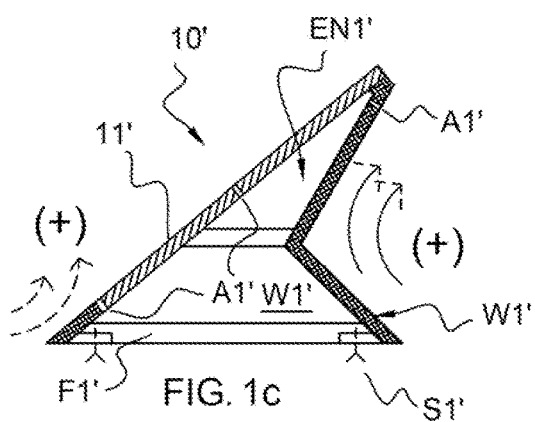
FIG. 1c: Sectional view of one embodiment of the invention
Figure 1D:
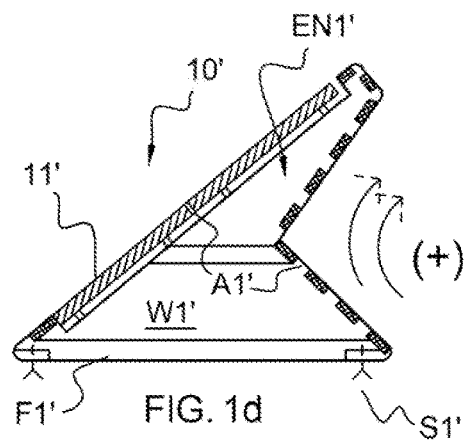
FIG. 1d: Sectional view of one embodiment of the invention

The following are exemplary embodiments of the present invention; they are not intended to limit the scope of the present invention. The terminology used to describe various assemblies and components is used in a generic sense, not limited to a specific illustration. Same designation is generally used to describe a component regardless of how it is shown in different illustrations. Variations in terminology may exist denoting like or similar components in different embodiments of the invention.

The designation 10' refers to wind-resistant photovoltaic modules or structures. The term photovoltaic structures or modules is used interchangeably in the present application. Designation 10' represents solar arrays 11' supported by hollow structural enclosures EN1'. Some examples of photovoltaic structures (10') are illustrated in the present application; other shapes and forms of photovoltaic structures/modules are within the scope of the present invention.

Wind-resistant photovoltaic modules 10' are hollow inside and are substantially enclosed from top, sides, back, and certain in cases from bottom as well. They are enclosed to enable reduction in wind loads on solar panels as well as to prevent vandalism of switchgear and provide weather protection for the switchgear. The term 'hollow structural enclosure' refers to a rigid and structural enclosure formed by solar panels (arrays) 11' and walls W1'. Walls W1' and structural frames F1' provide structural stability to photovoltaic modules 10'. The enclosure is configured to reduce at least 10% wind loads on solar arrays 11'.

Wind-resistant photovoltaic modules 10' are comprised of apertures A1' which aid in reduction in wind loads as well as provide at least 0.01 air changes per hour (ACH) ventilation to enable heat dissipation produced by solar panels 11'. Or the overall combined area of the apertures is at least 0.1% of the overall exterior surface area of photovoltaic modules 10'. If solar array 11' was subjected to a wind tunnel test and exposed to same wind loads with and without the disclosed enclosures, the result will indicate that at least 10% overall reduction in wind loads on solar array 11' is achieved. The aforementioned figures for wind load reductions and ventilation are given as a reference; they are not intended to limit the scope of the present invention. The core of the present invention in reduction in wind loads when the soar arrays 11' are supported by the disclosed hollow enclosures EN1' formed by walls W1'. Wind-resistant photovoltaic modules 10' can have elongated shapes when installed along a transportation route or a linear/curvilinear boundary. A plurality of photovoltaic modules 10' can be grouped together to form rectangular arrays for solar farms.

Designation 11' refers to solar panels or solar arrays facing one or more sunward directions supported by structural frames F1'. Solar arrays are comprised of plurality of solar panels placed in a predetermined arrangement, and electrically connected together. The solar panels may be based on technologies such as monocrystalline solar cell (mono-Si), crystalline silicon solar cell (c-Si), thin-film solar cell (TFSC), amorphous silicon solar cell (a-Si), organic solar cell (OPV), concentrated PV cell (CVP and HCVP), copper indium gallium selenide solar cells (CI(G)S), dye-sensitized solar cell (DSSC), photoelectrochemical cell (PEC), etc. In one embodiment of the present invention thin film solar cells are backed by rigid sheets to form solar panels 11'.

Designation W1' refers to walls or outer shells supporting the solar arrays 11' from below, behind or sides. Walls W1' have predetermined shapes as shown in different embodiments of the present invention. Walls W1 are made of rigid materials, rigid panels, louvers, grills, perforated rigid panels, closely spaced structural frames, posts, etc. Walls W1' form an enclosure for the photovoltaic modules 10' in various configurations to reduce wind loads on solar arrays which is the core of the present invention. Walls W1' are configured to reduce wind loads as well as to prevent vandalism and electrocution risks. In one embodiment of the invention walls or rigid panels W1' are tiled inwards toward hollow structural enclosure EN1' at a predetermined angle(s) to enable wind deflection away from solar arrays 11'.

Designation A1' refers to apertures formed in the walls W1' and/or solar arrays 11'. Apertures A1' enable pressure equalization within enclosures formed by walls W1' and solar arrays 11' and exterior to reduce wind loads on solar panels. Walls W1' and apertures 11' are configured to reduce positive wind loads as well as negative wind loads on solar arrays from 10%-90%. The aforementioned reductions are in comparison to if the same wind load were to be imposed on the solar arrays in the same orientation without walls W1' and apertures A1'.

The core of the present invention is the reduction of wind loads on solar arrays by a combination of walls W1' and apertures A1'. Apertures A1' are also used as means to enable ventilation behind or under solar arrays 10' for heat dissipation generated by solar panels. The apertures can be small gaps formed in between panels, between the perimeter of solar arrays 11' and walls W1' or holes made within walls W1'. The apertures, for example, can be from $1/16"$ to 4" wide depending upon the overall size of photovoltaic structures 10'.

Designation EN1' refers to hollow structural enclosures formed by a plurality of walls or rigid panels W1'. The hollow structural enclosures are pressure equalized and ventilated by predetermined apertures A1' to enable sufficient amount of ventilation to enable heat dissipation produced by solar arrays. In one embodiment of the invention the hollow structural enclosures EN1' are configured to be utilized for storage.

Designation PB100' refers to photovoltaic power banks placed along a network of roads, train tracks or liner boundaries. PB100's are part of an infrastructure energy generation system that utilizes plurality of photovoltaic power banks PB100' to enable at least 10% reduction in transportation emissions along transportation routes where plurality of photovoltaic power banks PB100' are installed (FIGS. 3a-11, 24a-27b). The terms 'linear configuration' or 'curvilinear configuration' refer to placement of photovoltaic modules 10' along road or a boundary. The term 'electrical daisy chain' refers to electrical connections formed with one photovoltaic module 10' to another in series, in parallel or a combination thereof to transmit electricity produced by solar panels 11'.

Designation F1' refers to structural frames necessary to support solar arrays 11'. Structural frames are made of rigid materials. For example they can be made of steel angles, channels, tubes, bent plates, etc. In one embodiment of the invention the aforementioned shapes are perforated or comprised of apertures A1' to enable ventilation behind or under solar panels.

In one embodiment of the present invention wind-resistant photovoltaic modules 10' consist essentially of solar arrays 11' supported by hollow structural enclosures EN1' and structural frames F1'. Hollow structural enclosures EN1' are formed with walls, rigid panels, louvers, grills or perforated panels W1' joined by structural frames F1' or structural clips supporting solar panels 11'. Apertures A1' are formed within the photovoltaic modules 10' and structural enclosures EN1' to allow for sufficient amount of natural ventilation behind or under solar panels 11'. The term 'sufficient' refers to the amount of ventilation needed to dissipate heat produced by solar panels as recommended by the manufacturer of solar panels. As the amount of heat generated by different solar panels is different, the number of apertures required and their sizes need to be calculated accordingly. For example thin film solar panels generate significantly less heat than the monocrystalline solar panels. Hollow structural enclosures EN1' act as electrical housings to protect one or more electrical circuits and/or switchgear necessary for electrical transmission.

Designation S1' refers to structural anchors or mechanical fasteners that can be used to structurally attach photovoltaic modules 10' to ground or to one another. Designation CL1' refers to structural clips that can be used to structurally attach a plurality of walls or rigid panels W1' together to form an enclosure or to structurally attach solar panels 11' to rigid panels.

Designation WT1' refers to water storage tanks configured to retain or detain rain water. Designation G1' refers to rainwater gutters and associated drains to collect and divert rainwater from solar panels in a predetermined direction. Designation P1' refers to structural posts as required to support photovoltaic modules or structures 10'.

Designation 13' represents electric transmission line configured to collect and transmit electricity produced by solar panels (arrays) 11'. Electric transmission line 13' is part of an off-grid electrical system, a grid-tied electrical system, a Distributed Energy Resource (DER) or a microgrid.

Designation 13a, 13b, EC1' represent electric transmission lines utilizing electricity produced by solar arrays 11' to power electric vehicles while in motion. Designation SW1' represents electric switchgear such as electrical circuits, electric connectors, couples, micro inverters, string inverters, controllers, optimizers, junction boxes, transfer switchers, circuit breakers, transformers, storage batteries and electricity monitoring devices. Designations R1 (R1') indicate a road. Designation TB1' indicates traffic barriers. Designation CZ1', CZ2' represent vehicle charging zones. Designation CP1' represent electric vehicle charging ports. Designation AM1' indicates amenities such shops, restaurants, service centers, shipping centers, warehouses, etc. The location of electrical transmission line 13' as depicted in figures is for example only, it can vary as per the requirements of a project. The photovoltaic power banks can also be installed in adjacent properties as part of the distributed energy resource (DER) system.

For clarity, like elements in drawings are generally labeled only once. Components that are insignificant to the core spirit of the invention are omitted to avoid clutter. Reasonable professional judgements can be made for errors and omissions by cross-referencing different embodiments of the present invention, drawings and claims in light of the spirit of the present invention. In the event a reference in the figures does not correctly correspond with the description or vise versa, that reference can be omitted without invalidating the core principles and claims of the present invention. Professional judgements regarding errors and omissions can be made by comparing one element serving a similar function with other examples illustrated and descried elsewhere in the present application.

FIGS. 1a-1d disclose an embodiment of the present invention in which wind-resistant photovoltaic modules 10' are comprised of solar panels 11' supported by inclined and/or louvered walls W1' having apertures A1'. Similar modules 10' are illustrated in FIGS. 22a-22e. Curved dashed arrows illustrate wind deflection direction achieved by walls W1' to reduce positive wind loads on solar panels 11'. Apertures A1' contribute towards reducing negative wind loads on solar panels 11'. Wind-resistant photovoltaic modules 10' can be 1 kW-5 kW portable units that can be structurally attached to ground with connectors S1' and also be connected with one another in a row formation by using conventional structural connectors to form larger size energy producing system. Photovoltaic modules 10' are electrically connectable together in series, in parallel or a combination thereof by using plug-and-play connections or by using hardwired electrical connections. Photovoltaic modules 10' can also be placed on wheels (not shown) for flexible placement as required.

Figure 2A:
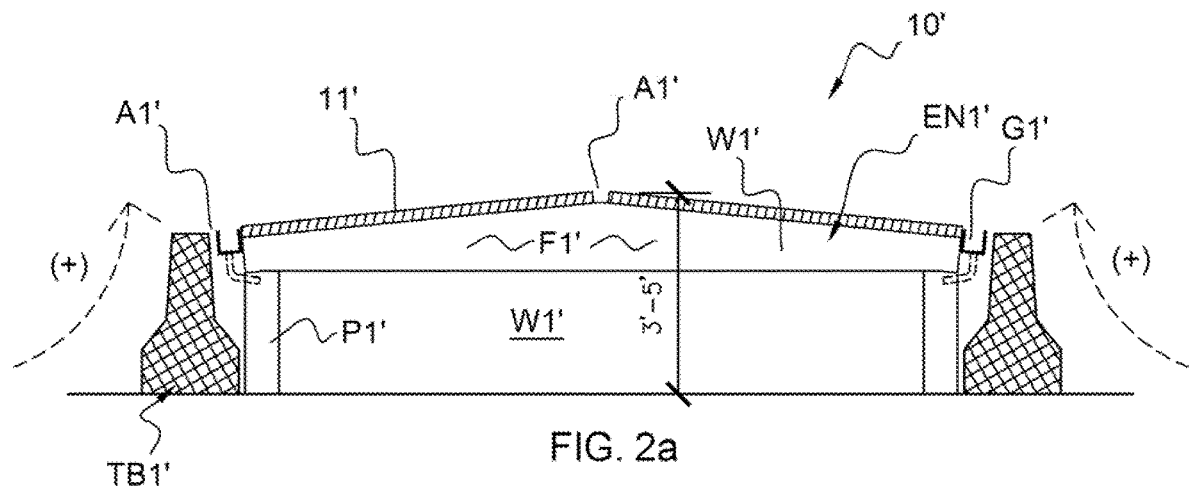
FIG. 2a: Sectional view of one embodiment of the invention
Figure 2B:
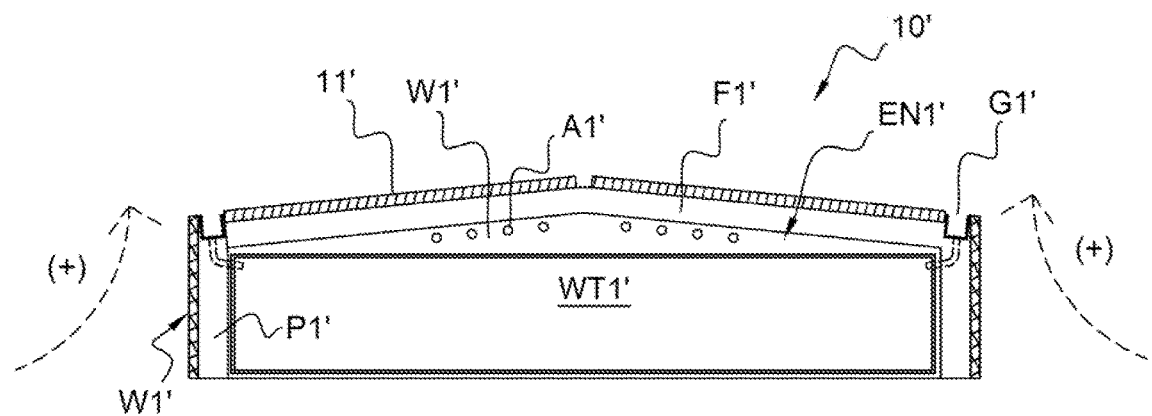
FIG. 2b: Sectional view of one embodiment of the invention
Figure 2C:
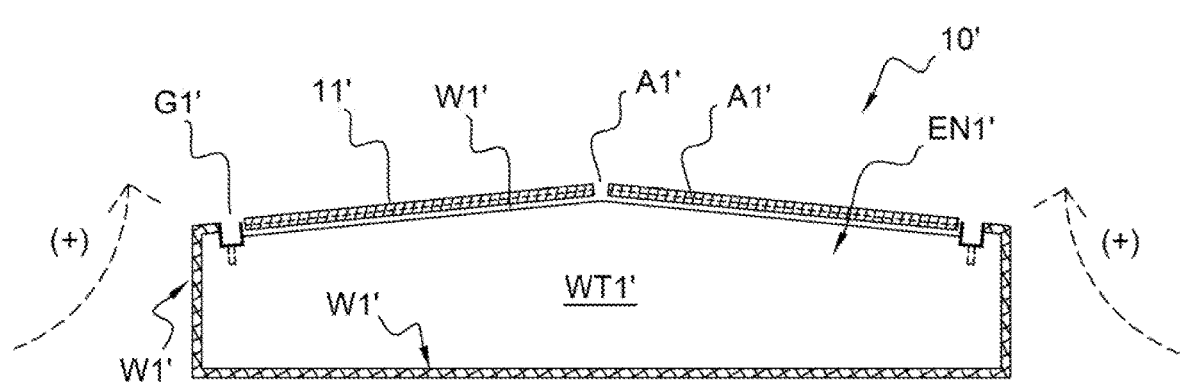
FIG. 2c: Sectional view of one embodiment of the invention

FIGS. 2a, 2b, 2c disclose embodiments of the present invention in which wind-resistant photovoltaic structures 10' are comprised of solar panels 11' supported by walls W1' comprising apertures A1'. FIG. 2a illustrates the placement of photovoltaic structures 10' adjacent to traffic barriers TB1' in which photovoltaic structure 10' is independently supported by using posts P1'. Traffic barriers TB1' are separated from photovoltaic structure 10' by a predetermined distance to prevent damage to solar arrays 11' from vehicular impacts on walls W1'; yet they act as wind deflectors to provide reduction in positive wind loads on solar arrays 11'. Wind-resistant photovoltaic structures 10' as shown in FIGS. 2b, 2c are comprised of water storage tanks WT1' to enable rain water collection from solar arrays 11' by using rain water gutter G1'. Water tanks WT1' can be placed as independent unit under photovoltaic structure 10' as shown in FIG. 2b; or solar arrays can be directly mounted on the walls of water tank WT1' as shown in FIG. 2C which forms an integrated module for rainwater collection as well to generate electricity from solar energy. Other shapes of photovoltaic arrays as shown in various other figures can be configured similarly to enable water detention or retention as required by local codes in certain jurisdictions.

Figure 4:
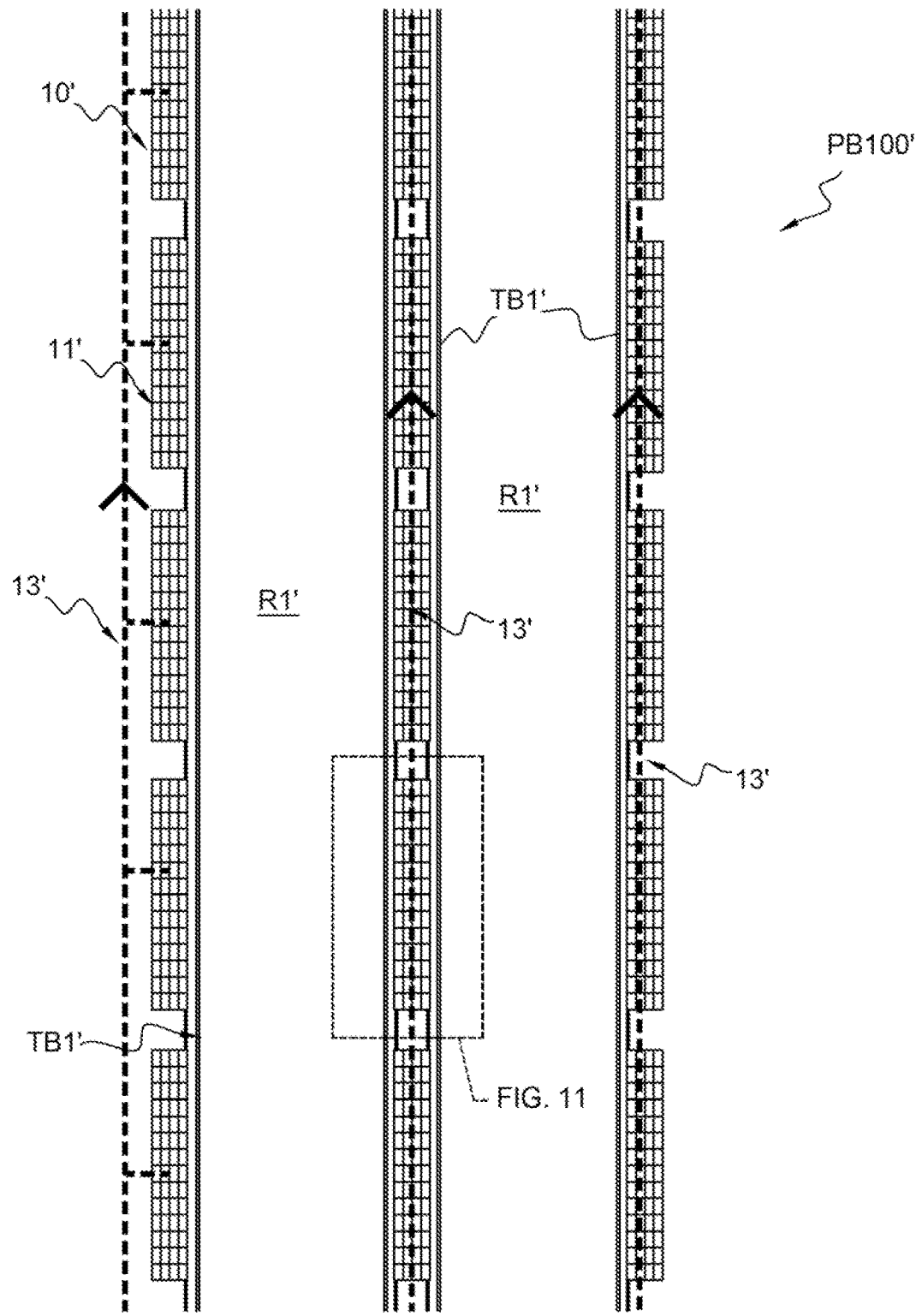
FIG. 4: Plan view of one embodiment of the invention

FIGS. 3a, 3b disclose an embodiment of an infrastructure energy generation system 1000' comprising a plurality of photovoltaic power banks PB100' placed along road R1' separated by predetermined distances X1'. FIG. 4 illustrates plurality of wind-resistance photovoltaic structures 10' placed along roads R1' and electrically connected together with electricity transmission lines 13'. Photovoltaic structures 10' are protected with traffic barriers TB1'.

Figure 5:
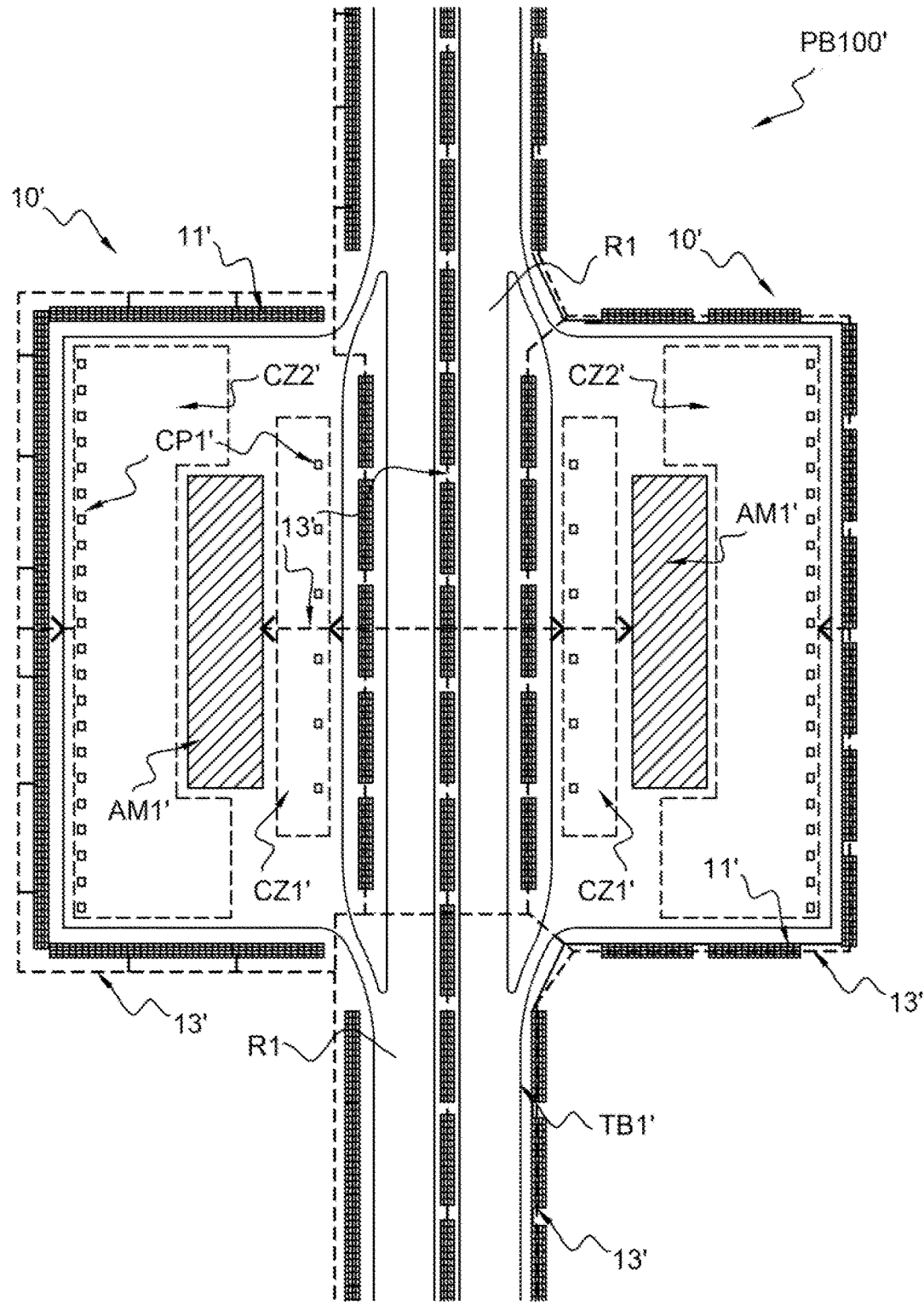
FIG. 5: Plan view of one embodiment of the invention
Figure 6:
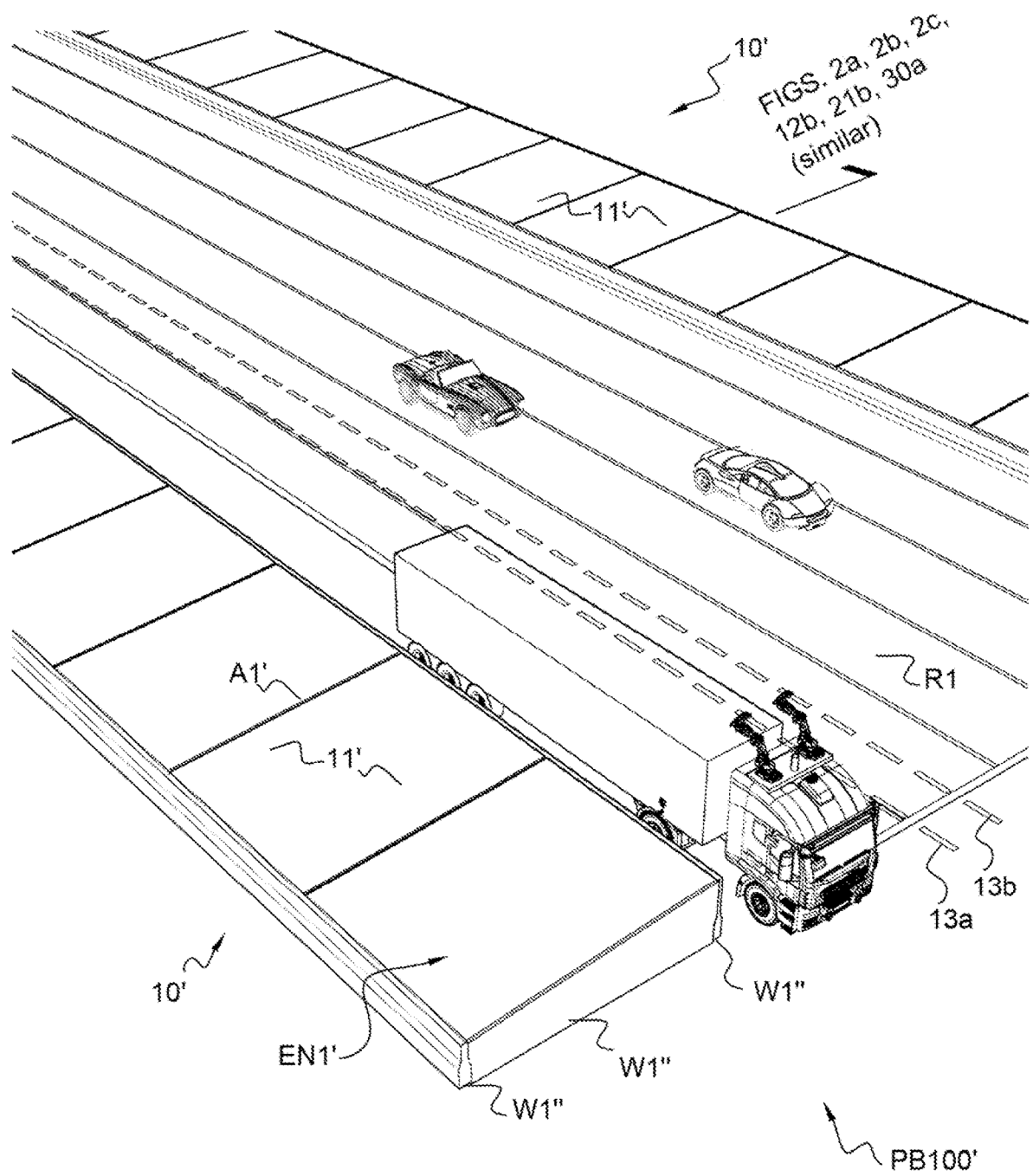
FIG. 6: 3D view of one embodiment of the invention
Figure 7:
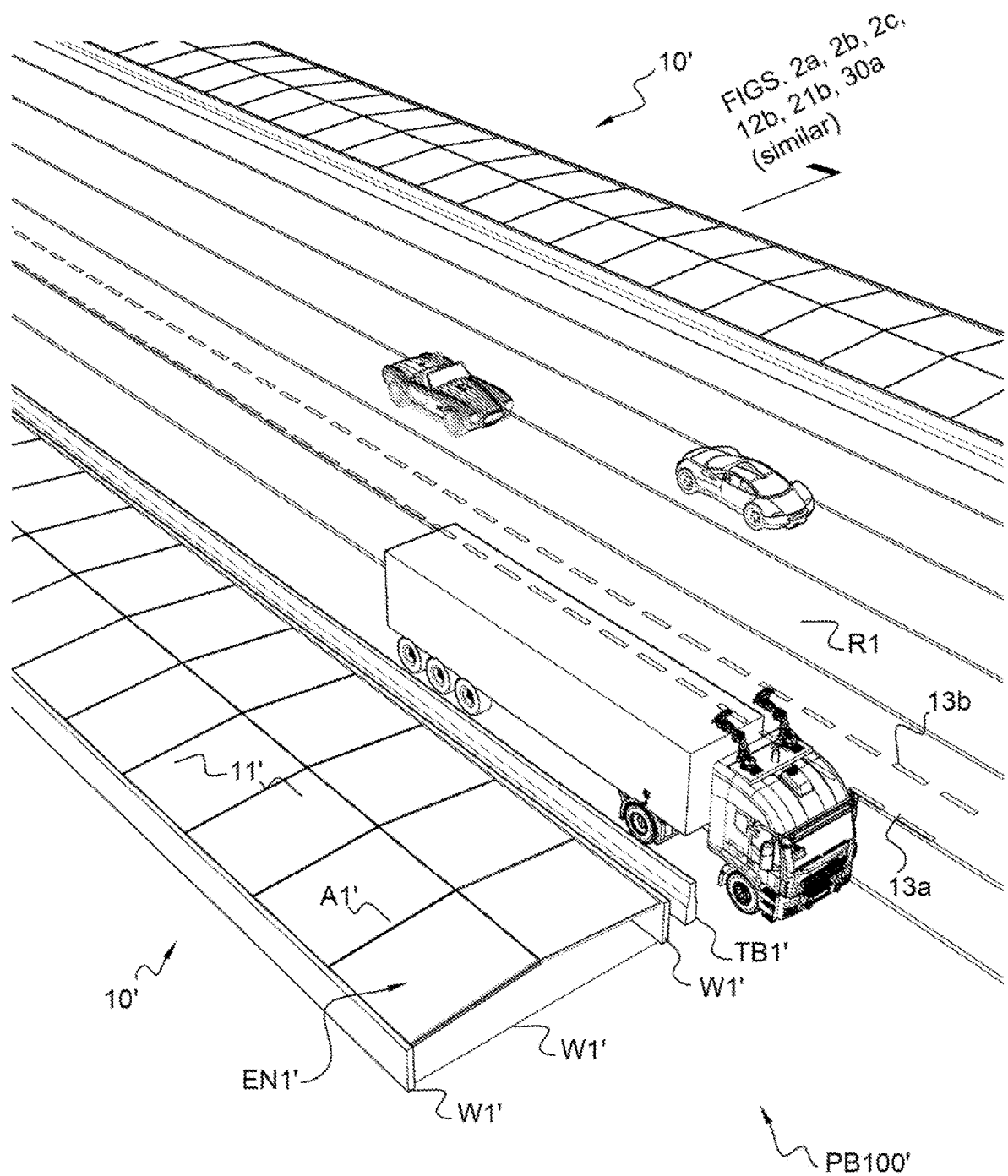
FIG. 7: 3D view of one embodiment of the invention
Figure 8:
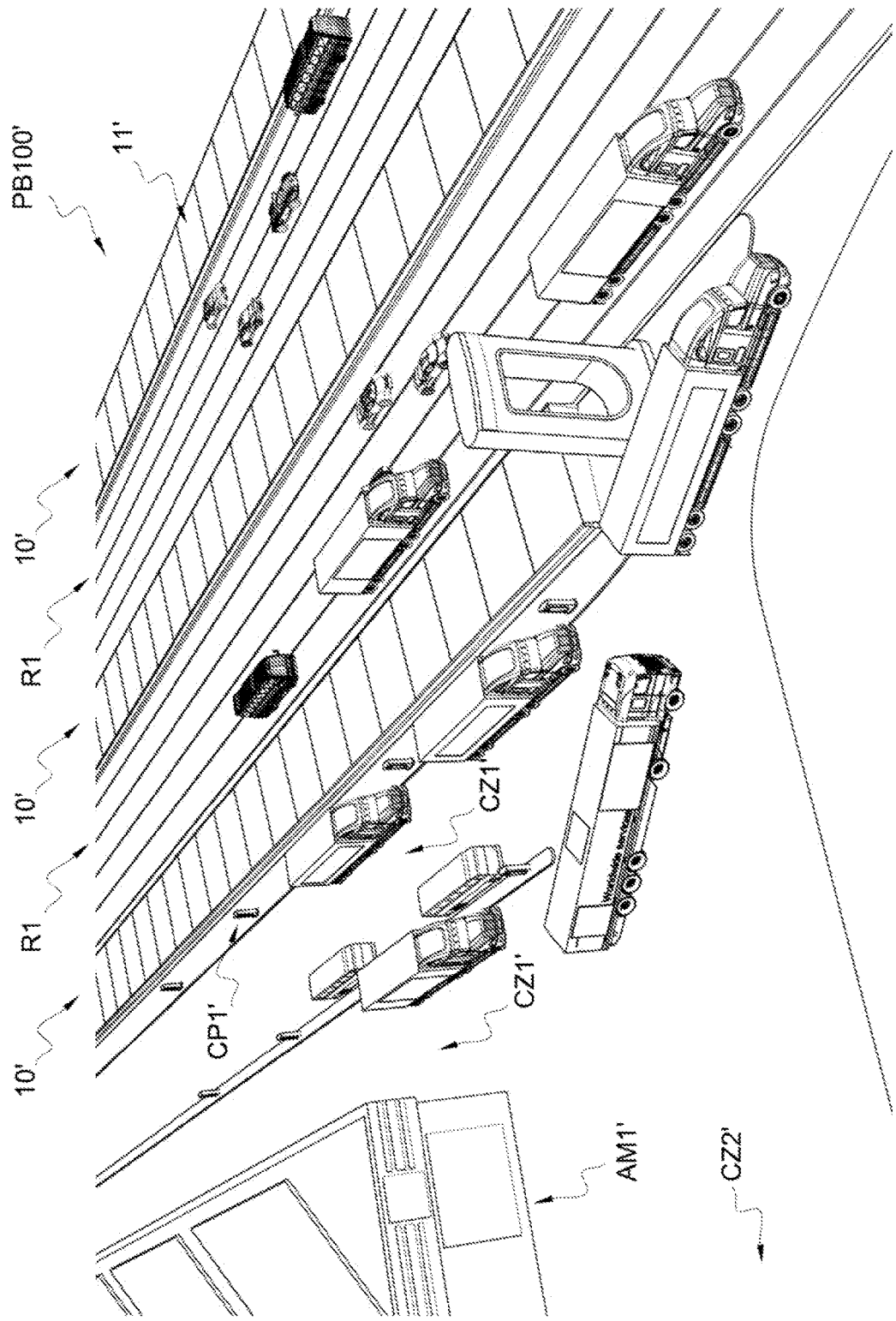
FIG. 8: 3D view of one embodiment of the invention
Figure 9:
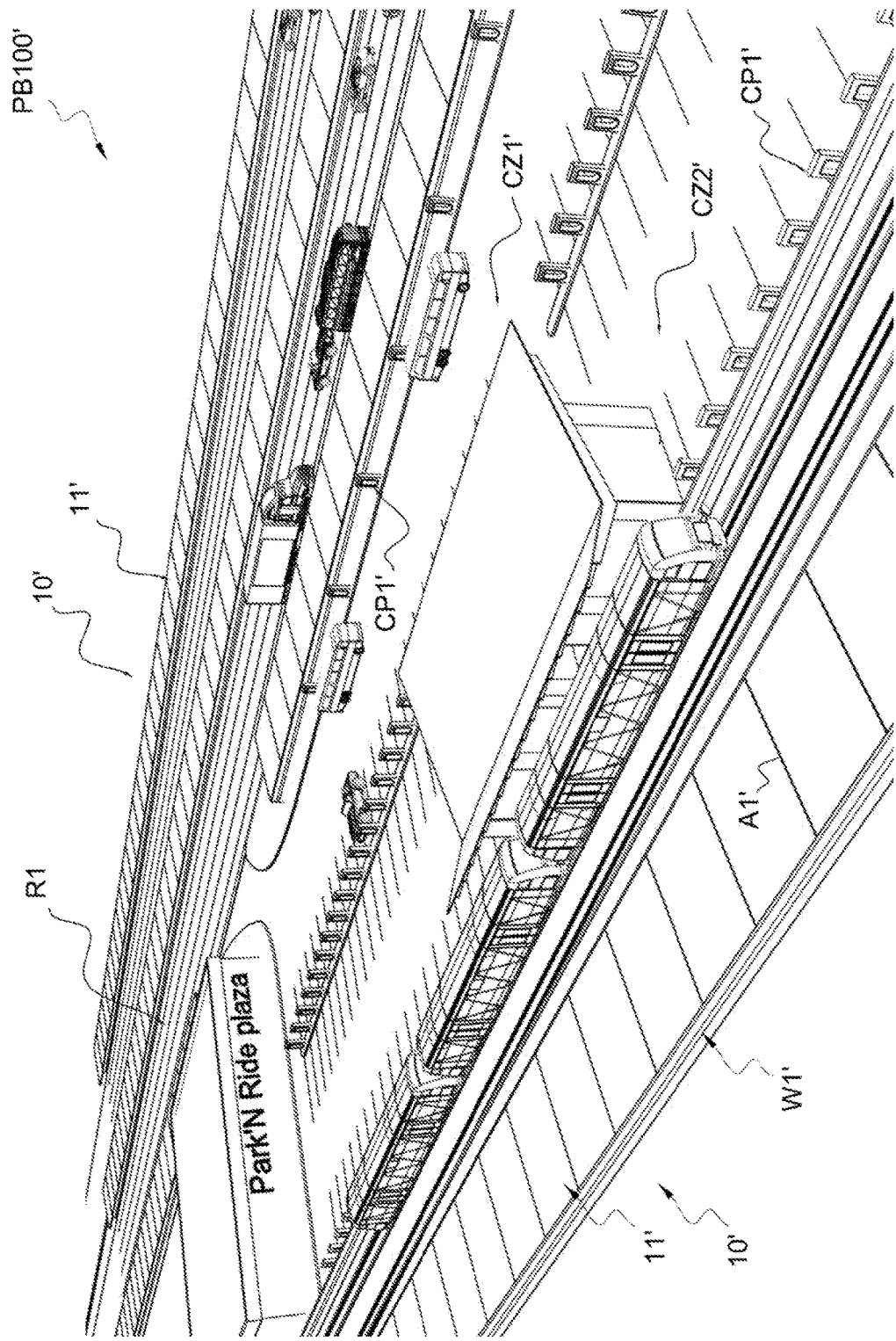
FIG. 9: 3D view of one embodiment of the invention
Figure 10:
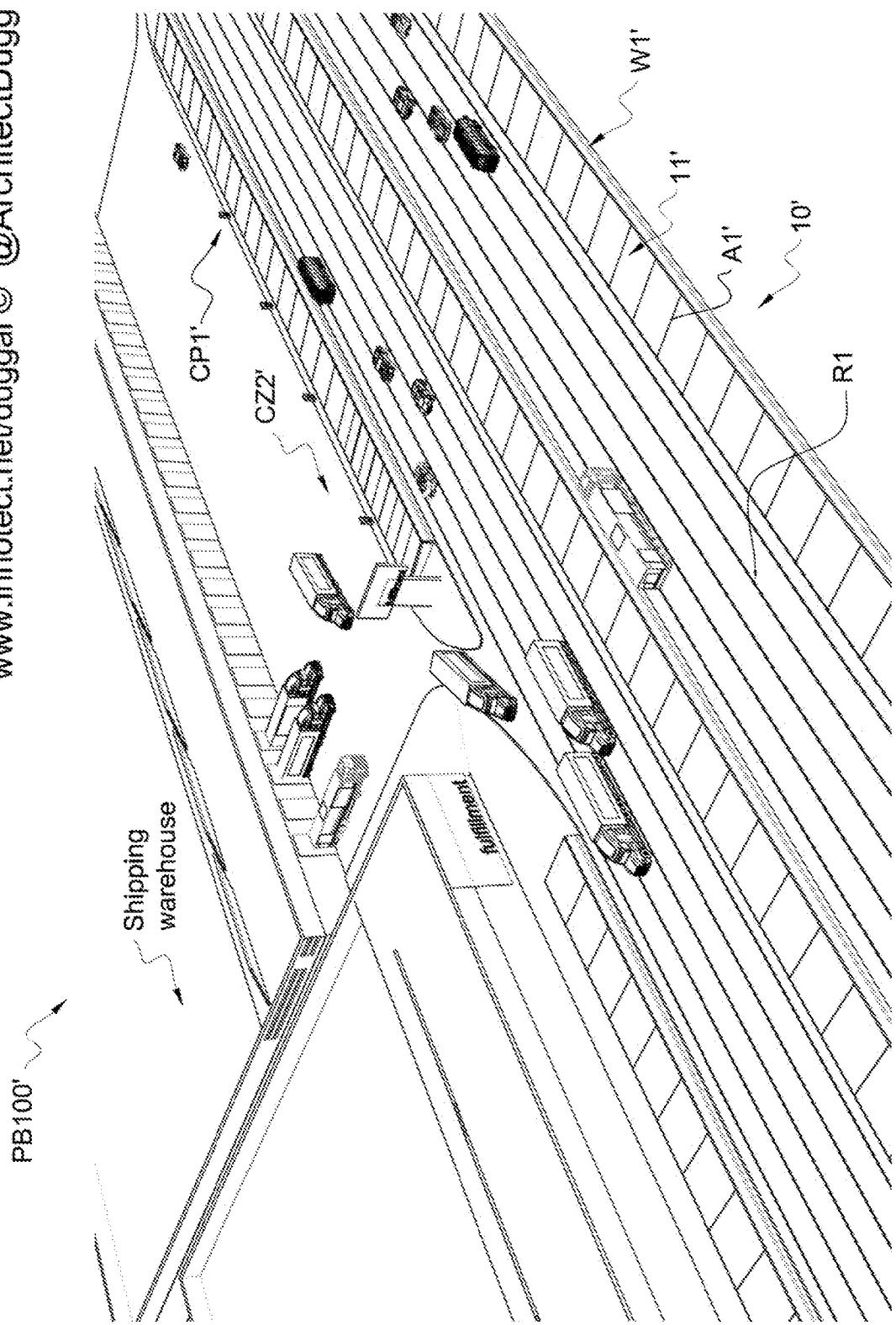
FIG. 10: 3D view of one embodiment of the invention

FIG. 5 discloses an arrangement of photovoltaic power bank system PB100' configured to facilitate electric vehicle charging along roads R1. Photovoltaic power bank system PB100' is comprised of wind-resistance photovoltaic structures 10' placed in a linear arrangement along roads R1 and around vehicle charging zones CZ1', CZ2'. Vehicle charging zones CZ2' are configured with charging ports CP1' to charge passenger vehicles. Vehicle charging zones CZ1' are configured with charging ports CP1' to charge commercial vehicles such as trucks. Vehicle charging zones CZ1', CZ2' are further comprised of amenities AM1' comprising shops and restaurants enabling travelers to take a break from driving while their vehicles are being charged. The electricity produced by solar arrays 11' is directed to vehicle charging ports CP1' by using electricity transmission lines 13' and switchgear SW1' as shown in various figures of the present invention. The aforementioned arrangement is further illustrated with 3D figures shown in FIGS. 6, 7, 8, 9, 10. FIGS. 6, 7 further illustrate how electric vehicles can be charged while in motion by using electric conductors 13a, 13b. FIG. 8 illustrates a configuration of vehicle charging zone CZ1' for commercial vehicles. FIG. 9 illustrates how electric trains and buses can be arranged around vehicles charging zones CZ1', CZ2' to enable electrified transportation along roads R1.

Figure 11:
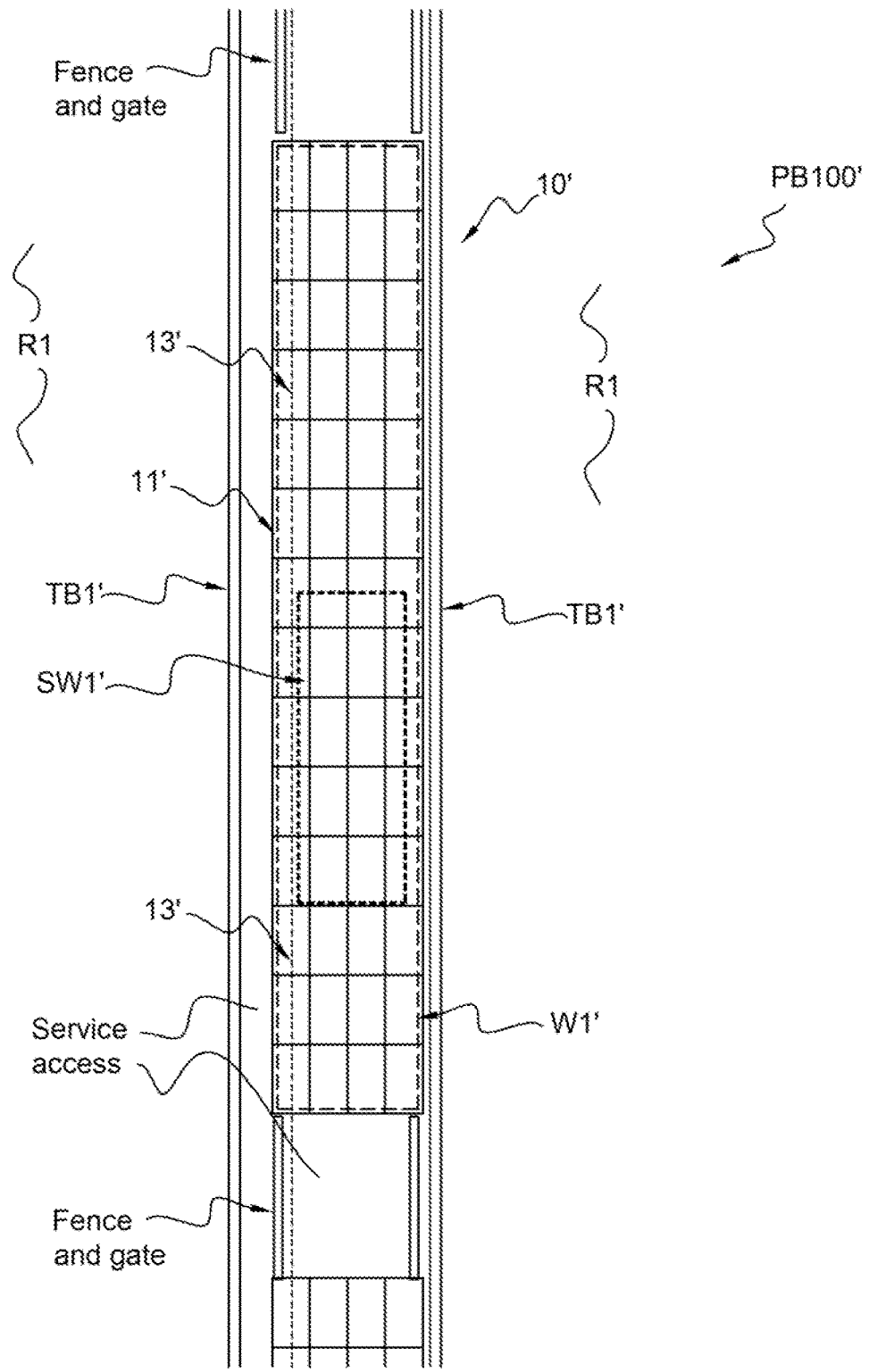
FIG. 11: Plan view of one embodiment of the invention

FIG. 11 discloses an arrangement of photovoltaic power bank system PB100' comprising wind-resistance photovoltaic modules 10'. In this configuration electrical switchgear SW1' is placed under a photovoltaic module 10'. Similarly water tanks WT1' can be placed under photovoltaic modules and structures 10'. Photovoltaic modules 10' are protected with traffic barriers TB1' while providing service access to photovoltaic modules 10'. Electric transmission line 13 is concealed within photovoltaic modules 10'. Traffic barriers TB1' act as wind deflectors to reduce positive wind pressure on photovoltaic modules 10' while protecting solar arrays 11'.

Photovoltaic power bank system PB100' (FIGS. 2a-13b) comprises a plurality of wind-resistant photovoltaic modules 10' placed along a transportation route or a boundary in a linear or a curvilinear configuration forming an electrical daisy chain connecting solar panels 11' in series, parallel or a combination thereof. Each of wind-resistant photovoltaic modules 10' have 1 kW-100 kW electric production capacity and is configured to electrically connect to an off-grid electrical system, a grid-tied electrical system, a Distributed Energy Resource (DER) or a microgrid. The wind-resistant photovoltaic module or structure 10' is substantially enclosed from top with a plurality of solar panels facing one or more sunward directions. The wind-resistant photovoltaic module 10' is substantially enclosed from all sides with traffic barriers TB1' and/or walls, rigid panels, louvers, grills or perforated panels (W1') configured to reduce positive wind loads on solar panels 11' by at least 10% when compared to same wind loads without the traffic barriers, walls, rigid panels, louvers, grills or perforated panels. The wind-resistant photovoltaic module 10' is comprised of predetermined apertures A1' configured to reduce wind loads on said solar panels as well to provide natural ventilation. The wind-resistant photovoltaic module 10' is hollow inside and ventilated to allow at least 0.01 air changes per hour enabling heat dissipation produced by said solar panels 11'. In one embodiment of the invention natural ventilation behind solar panels is achieved by providing apertures whose combined opening area is at least 0.1% of the total surface area of photovoltaic module 10'. Wind-resistant photovoltaic module 10' is a self-contained unit configured to conceal electrical circuits and/or switchgear used for transmitting electricity produced by solar arrays 11'.

FIGS. 12a, 12b, 13a, 13b, 13c disclose an embodiment of photovoltaic power bank system PB100' comprising wind-resistance and vehicular impact resistant photovoltaic modules 10' arranged in a linear configuration. They can also be arranged in any other configuration for example as rectangular arrays or in a curvilinear configuration. The shape of walls W1' facing road R1' is configured as a traffic barrier. Any traffic barriers meeting the approved of a transportation department having jurisdiction can be substituted for walls W1'.

In one embodiment of the invention solar panels 11' are attached to walls W1' with structural isolation system ST1' as shown in FIGS. 12b, 13a, 13b, 13c. Structural isolation system ST1' is comprised of structural pins ST1a attached to solar panel frames F1'. Structural brackets ST1b are attached to walls W1' at predetermined locations corresponding to structural pins ST1a. Structural brackets ST1b comprise openings ST1c having a predetermined shape within the brackets. Openings ST1c are bigger than structural pins ST1a (for example from about ⅛" to 3" bigger) to allow movement of structural pins within the opening. In one embodiment of the invention opening ST1c has an elongated or elliptical shape to allow for movement of structural pins ST1a in direction X1' as shown by an arrow in FIG. 13c. Structural pins ST1a are locked from underneath with lockable fasteners ST1d.

Structural isolation system ST1' enables protection of solar panels 11' against vehicular impacts on walls W1' or traffic barriers TB1'. If a vehicular impacts occurs on wall W1' or traffic barrier TB1', structural pins ST1a move in the direction of the impact from about ⅛" to 3" within openings ST1c without damaging structural frames F1'. Therefore the structural stresses due to vehicular impact on walls W1' or traffic barriers TB1' are prevented or minimized by at least 10% to impact structural frames F1'. In one embodiment of the invention openings ST1c are fitted with hard rubber gaskets ST1e to secure the joint against movement, yet allow for movement during an impact. If an impact occurs on walls W1' or traffic barriers TB1', gaskets ST1e are compressed in the X1' direction as indicated by an arrow on FIG. 13c. In one embodiment of the invention structural pins ST1a are fitted with hard rubber sleeves to minimize structural stresses on walls W1' or traffic barriers TB1' due to vehicular impacts.

Structural isolation system ST1' is configured to achieve at least 10% reduction in structural stresses on structural frames F1' or on solar panels 11' when compared with same structural stresses without the use of structural isolation joint system ST1'. Other forms of structural isolation joints such as attachment of structural frames F1' with walls W1' or traffic barriers TB1' by using mechanical or hydraulic shock absorbers, air cushions etc. is within the scope of the present invention.

Figure 12A:
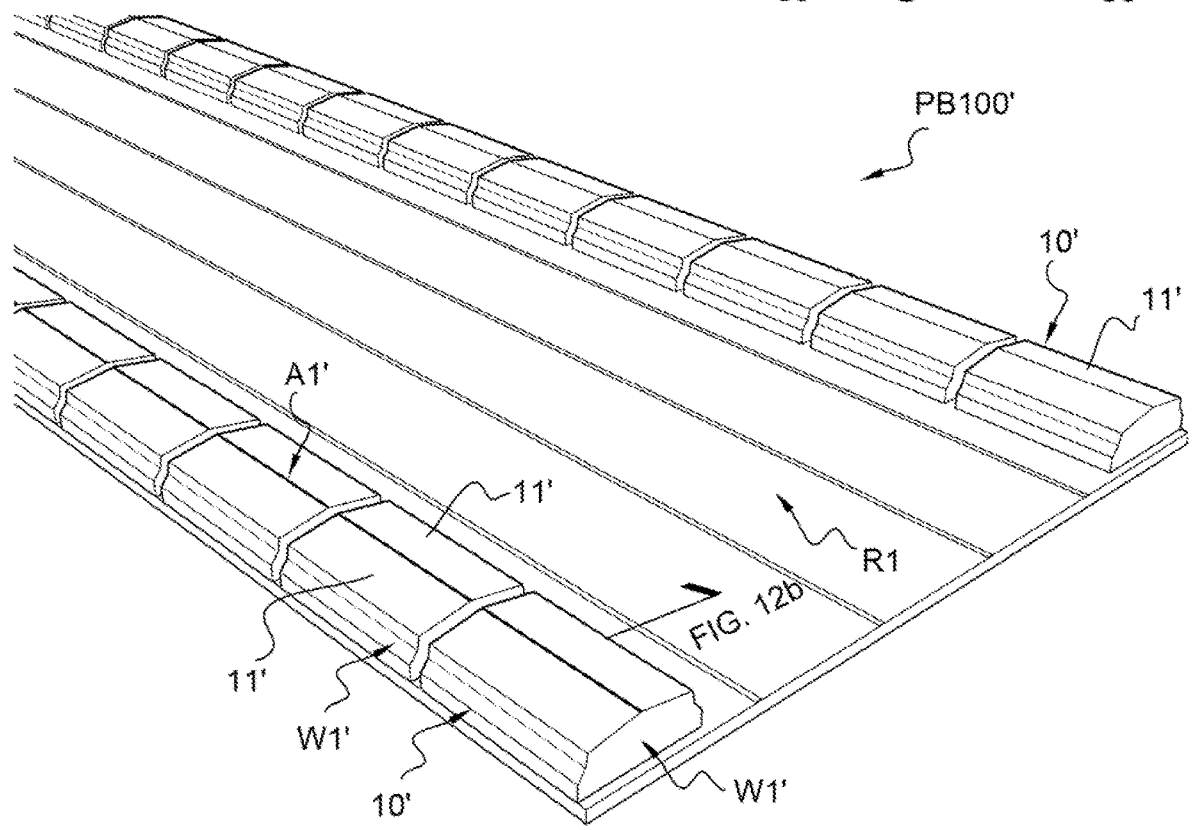
FIG. 12a: 3D view of one embodiment of the invention
Figure 12B:
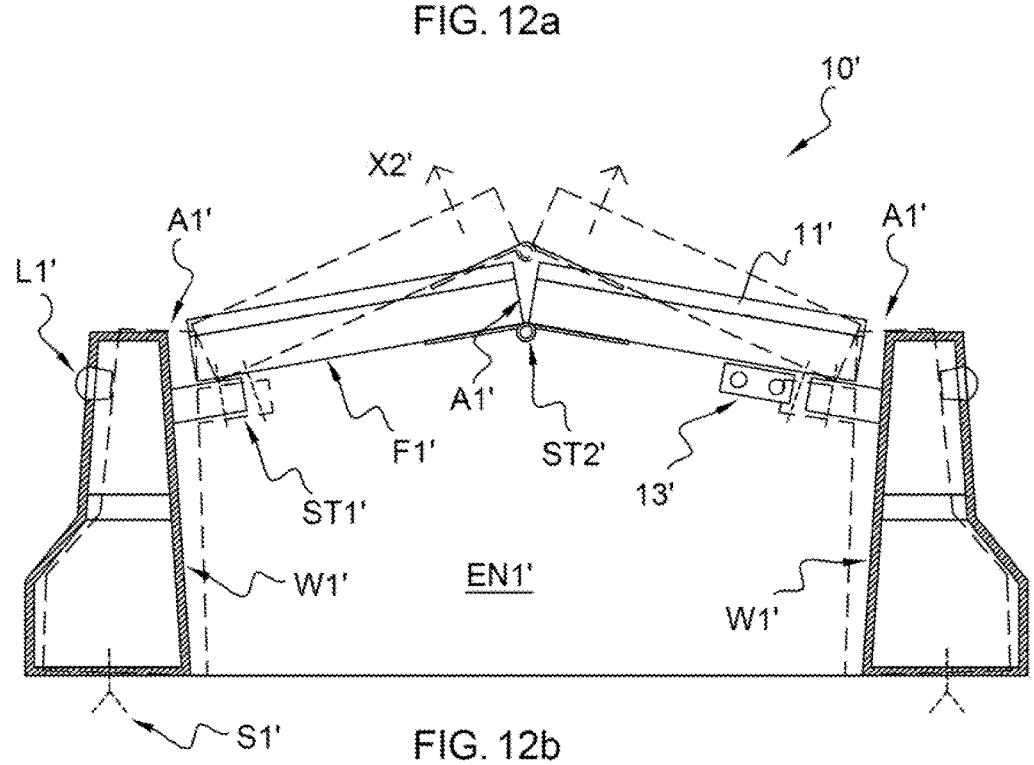
FIG. 12b: Sectional view of one embodiment of the invention
Figure 13A:
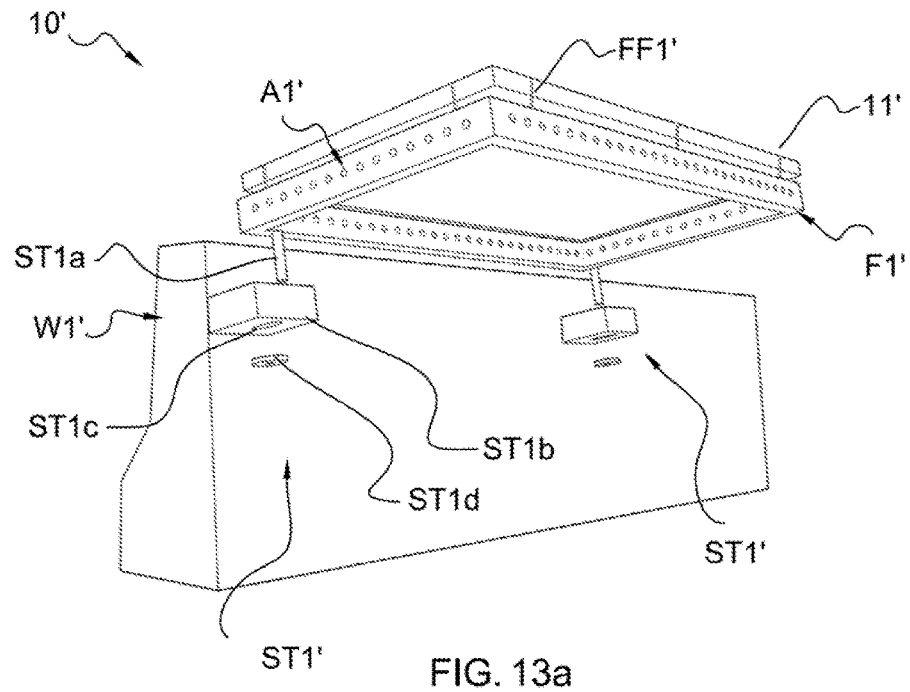
FIG. 13a: 3D view of one embodiment of the invention
Figure 13B:
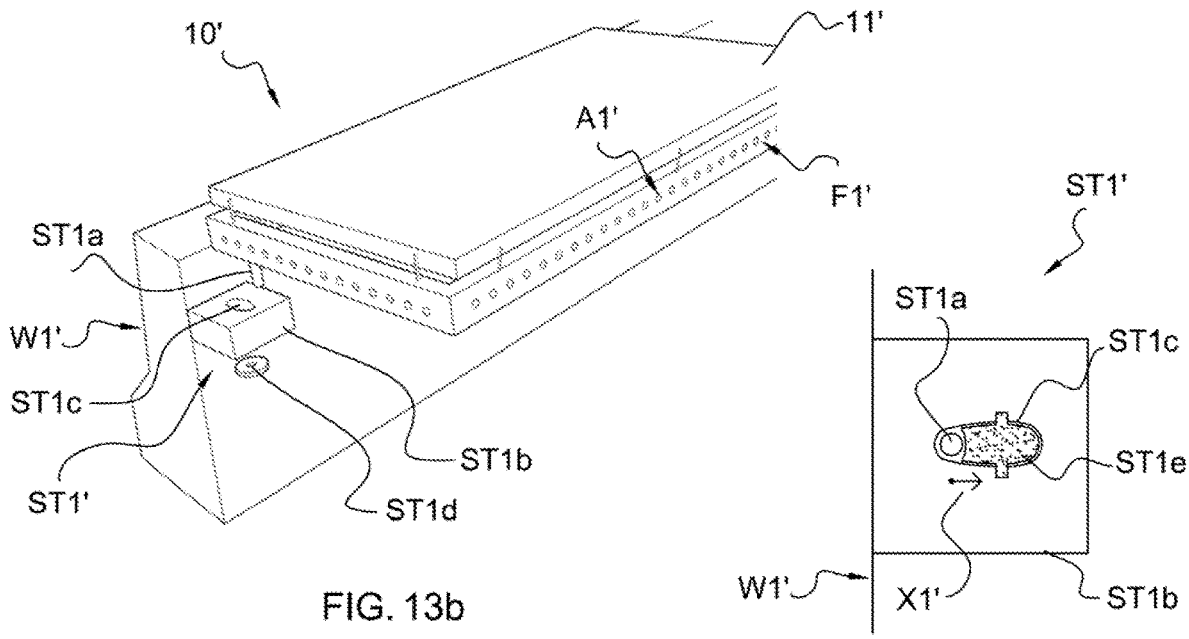
FIG. 13b: 3D view of one embodiment of the invention
Figure 13C:
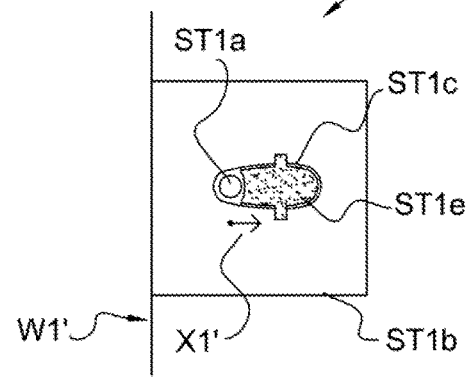
FIG. 13c: Plan view of one embodiment of the invention

In one embodiment of the invention structural isolation is achieved by providing a resilient or a hinged connection ST2' at the ridge formed by solar arrays 11' as shown in FIG. 12b. The slope of the ridge can be from about 1% to 20%. Solar arrays 11' supported by structural frames 11' are connected together with hinged or flexible connections ST2' enabling structural isolation. The structural isolation connection ST2' is comprised of resilient metal strips or synthetic composite shapes having a predetermined modulus of elasticity configured deform when a structural stress is applied on the connection, and return to their shape thereafter; or it is comprised of hinged connections. During an impact on walls W1' or traffic barriers TB1' if the wall or traffic barrier shifts as shown by dashed lines (FIG. 12b), structural frames F1' fold in the X2' direction as shown by dashed lines thereby preventing damage to structural frames F1' and solar panels 11'. After the impact the hinge or resilient mental ST2' isolation joints return to their original shape. Structural isolation system ST2' is configured to reduce structural stresses on structural frames F1' due to a vehicular impact on walls W1' by at least 10%. In one embodiment of the invention both structural isolation joints ST1' and St2' are used to achieve at least 10% overall reduction in structural stresses on structural frames F1' or on solar panels 11' due to vehicular impacts. This includes providing rubberized gaskets or flexible fasteners FF1' between all joints and connections of solar arrays 11'. The aforementioned testing can be based on vehicular car crash tests as developed by the National Highway Traffic Safety Administration (NHTSA) or computer simulations.

The aforementioned descriptions represent a system and a method of structural isolation for prevention of damage to solar panels due to vehicular impacts on walls or traffic barriers supporting the solar panels. The system and method comprises providing structural isolation joints (ST1') between the walls and the structural frames supporting solar panels; providing structural isolation joints (ST2') at the ridge of structural frames (F1'); or providing a combination of structural isolation joints (ST1') and (ST2'). Structural isolation joints (ST1') are comprised of a pinned connections or movement joints between the walls or traffic barriers and structural frames to allow for movement during a vehicular impact on walls or traffic barriers. Structural isolation joints (ST2') formed at the ridge comprise hinges or resilient metal strips allowing the joint to flex during a vehicular impact on the walls or traffic barriers. The disclosed system and a method of structural isolation achieves at least 10% reduction in structural stresses on solar arrays 11' due to vehicular impacts on the walls or traffic barriers when compared without the aforementioned means of structural isolation i.e. ST1', ST2' or a combination thereof. Therefore solar arrays 11' are substantially protected from damage due to vehicular impacts on walls W1' or traffic barriers TB1'. In one embodiment of the invention solar panels 11' are attached to structural frames F1' with flexible fasteners FF1' to further isolate solar panels 11' from structural impacts on walls W1'. Flexible fasteners FF1' are made of a rubberized composite, a resilient metal, a sythetic composite or a combination thereof configured to flex and return to their original shape after an impact. The aforementioned system and method of structural isolation is novel as it enables to structurally isolate solar panels 11' from vehicular impacts on walls W1' or traffic barriers TB1' preventing damage to solar panels. The aforementioned system can be utilized for all the embodiments of the present invention and for any other similar configurations.

Figure 14A:
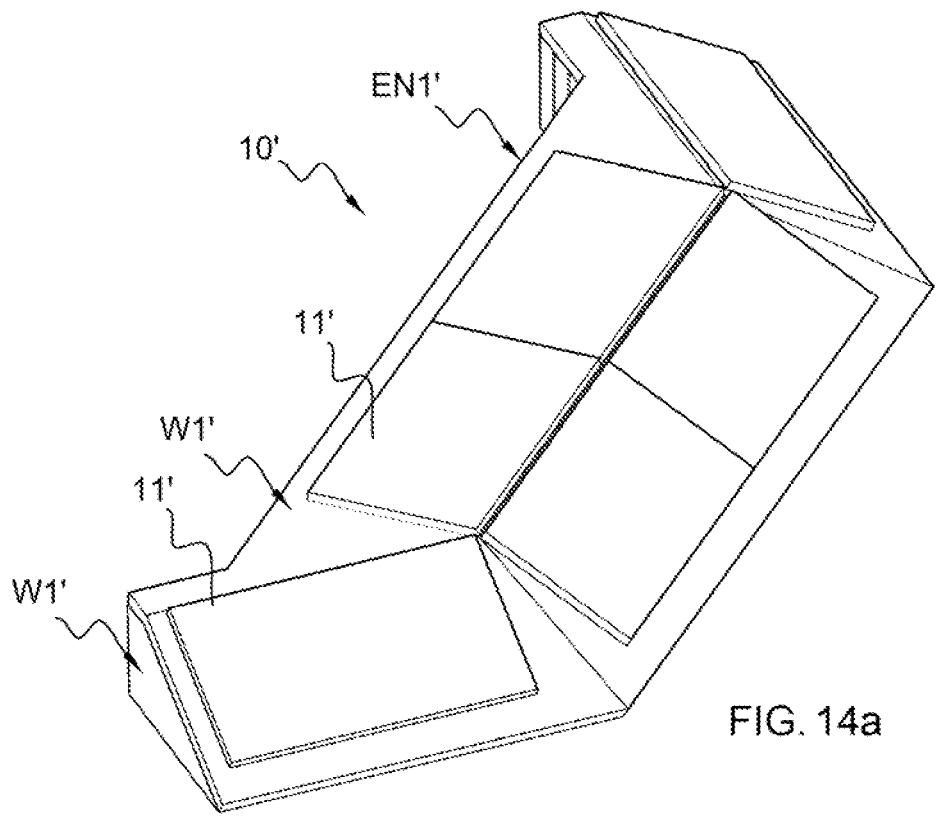
FIG. 14a: 3D view of one embodiment of the invention
Figure 14B:
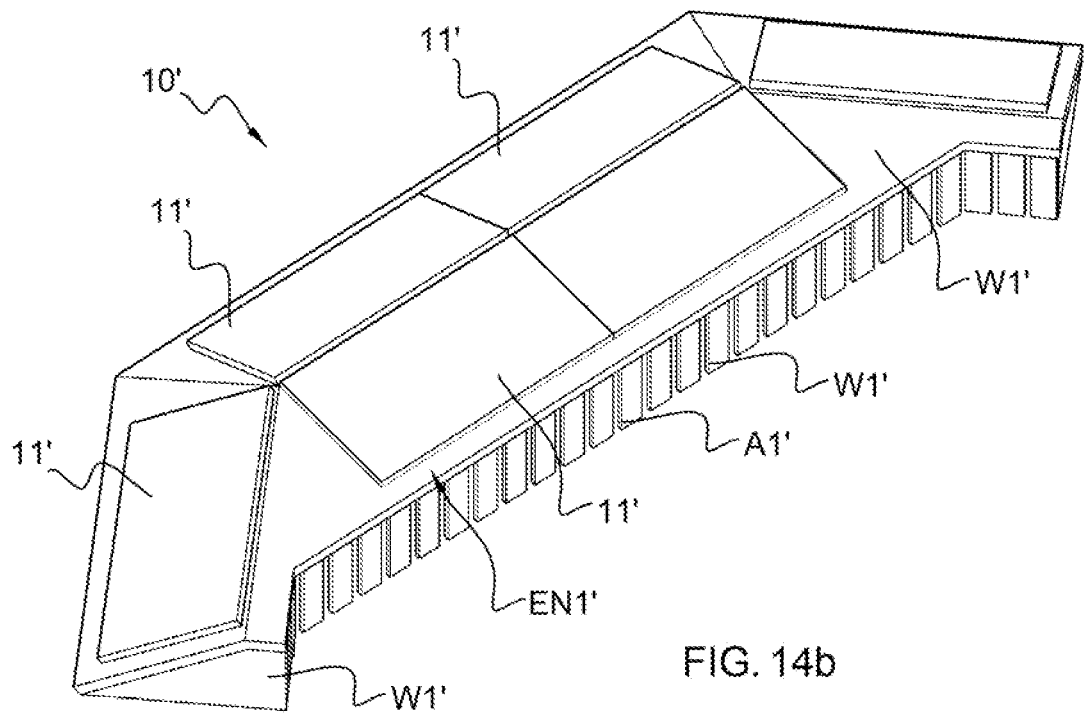
FIG. 14b: 3D view of one embodiment of the invention

FIGS. 14*a*, 14*b* disclose an embodiment of the present invention in which wind-resistant photovoltaic module 10' is comprised of a hollow structural enclosure EN1' formed by a plurality of walls W1' and solar panels 11'. Walls W1' form the outer shell of the hollow enclosure. Solar panels face a plurality of sunward directions for solar exposure from multiple directions during the day. At least one vertical face of the photovoltaic module 10' is comprised of a plurality of apertures to allow for ventilation for solar panels 11'. Additional apertures can also be made in between solar panels 11'. Walls W1' can be made of fiber reinforced plastic or a synthetic resin which allows for formation of various shapes. Photovoltaic module 10' is substantially concealed from all side to protect switchgear for solar panels within the enclosure. Sloping walls W1' enable to provide reductions in wind loads. Photovoltaic module 10' can be held in place with structural anchors or it can be made portable, and held in place with ballast inside the enclosure.

Figure 15:
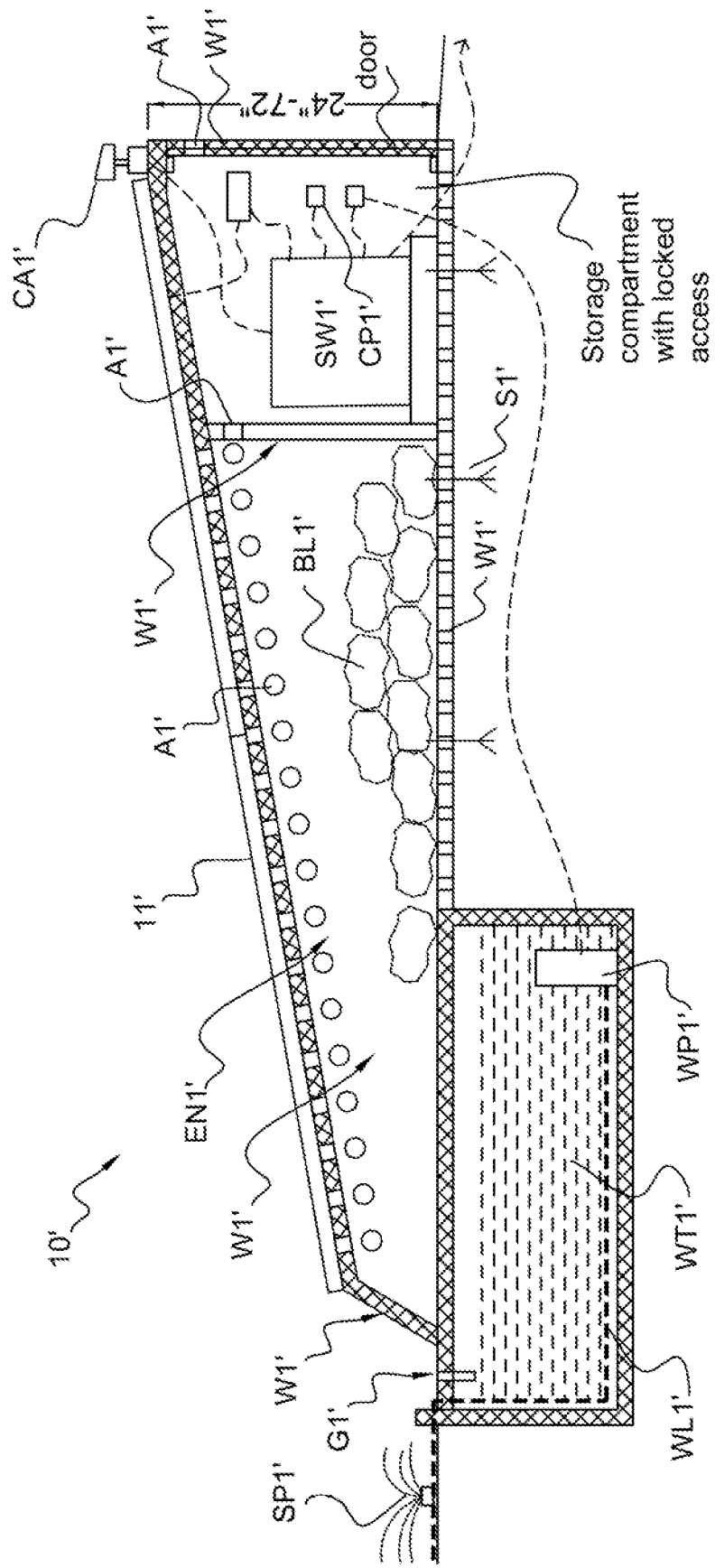
FIG. 15: Sectional view of one embodiment of the invention
Figure 17:
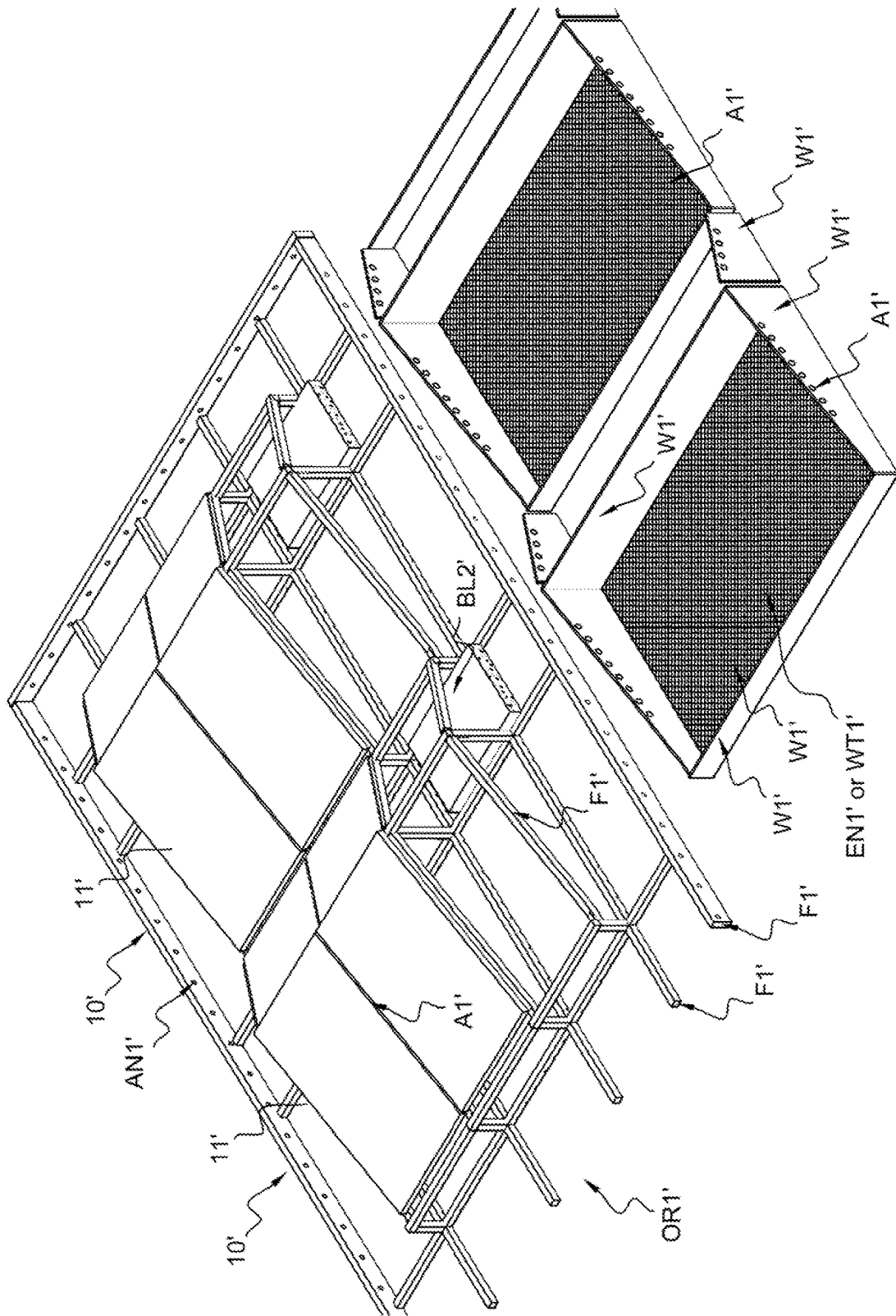
FIG. 17: 3D view of one embodiment of the invention

FIG. 15 discloses an embodiment of the present invention in which wind-resistant photovoltaic module 10' is comprised of hollow structural enclosure EN1' formed by a plurality of walls W1' and solar panels 11'. It also comprises underground water storage tank WT1' configured to receive rainwater fallen on solar panels 11' by gutter G1'. Water storage tank WT1' comprises water pump WP1' and water line WL1' connected to water sprinklers SP1' or an irrigation water line. A storage compartment with an access door is formed within the hollow structural enclosure EN1' to house electrical switchgear SW1' and electrical charging ports CP1'. Hollow structural enclosure EN1' is held in place by ballast BL1' and/or structural anchors S1'. Walls W1' can be made of perforated rigid panels or apertures A1' can be provided within solid walls or rigid panels to allow sufficient amount of natural ventilation underneath solar panels 11' for heat dissipation produced by the solar panels. Wind-resistant photovoltaic module 10' further comprises video surveillance camera CA1' to protect the installation. The aforementioned configuration can be very useful for properties with lawns or for farmlands. The electrical equipment such as water pump WP1' is configured to utilize electricity produced by the solar panels; switchgear is comprised of electricity storage batteries.

Figure 28A:
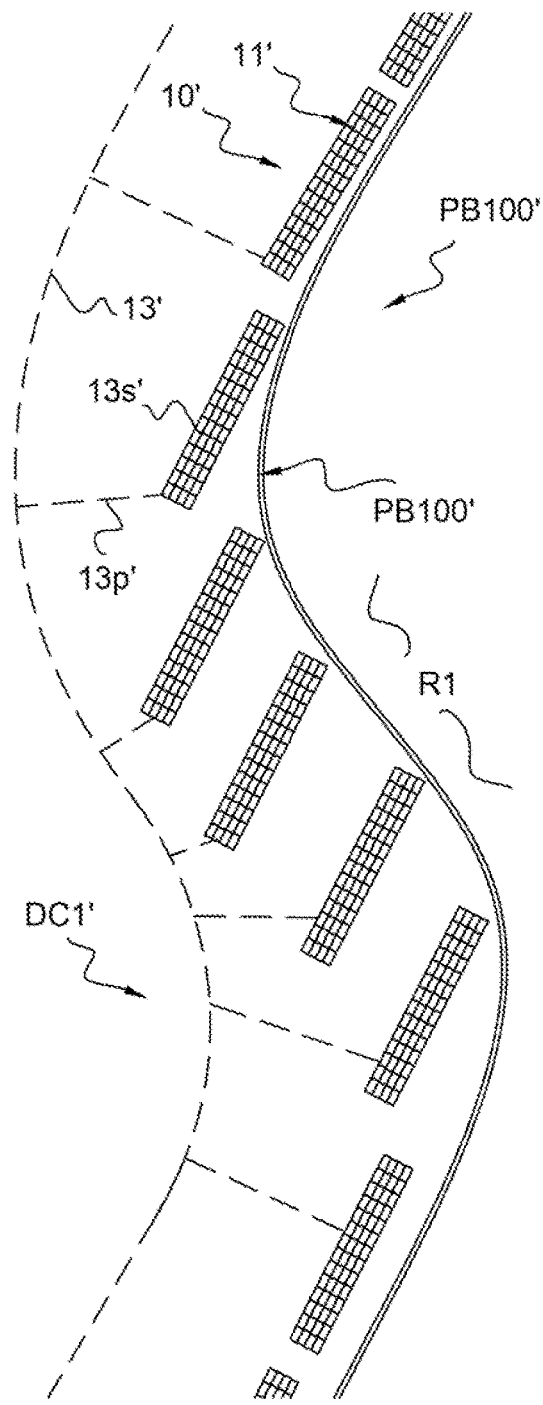
FIG. 28a: Site plan of one embodiment of the invention
Figure 28B:
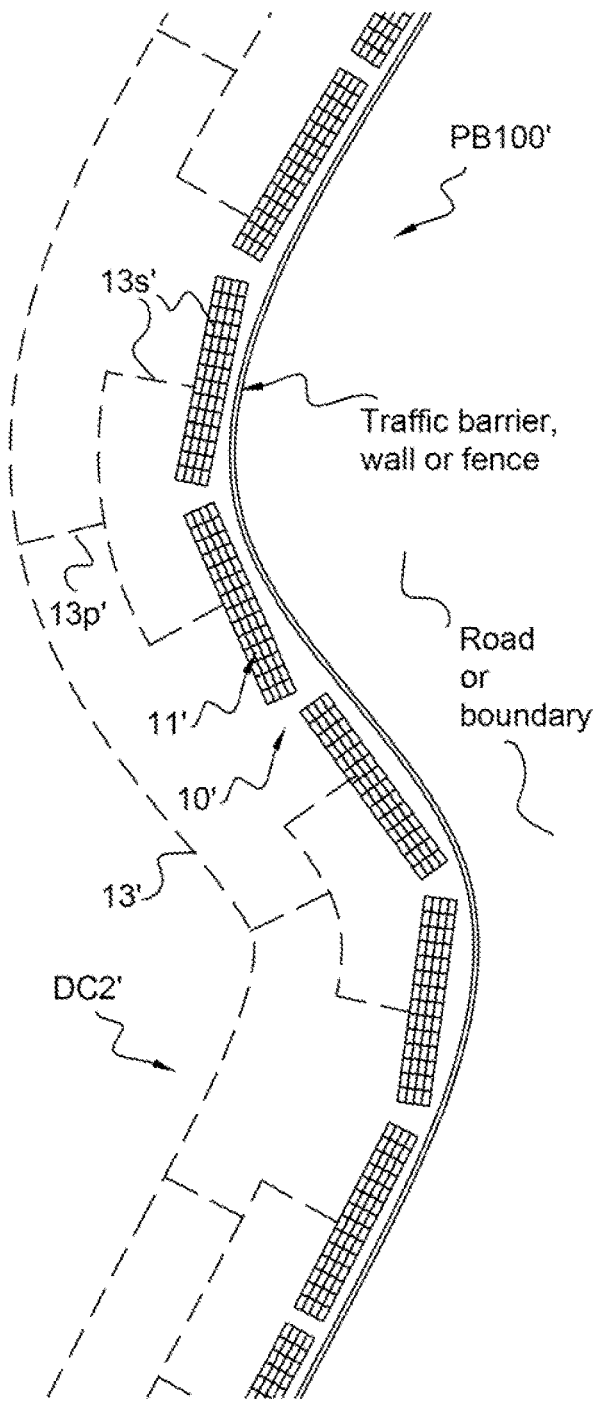
FIG. 28b: Site plan of one embodiment of the invention
Figure 29:
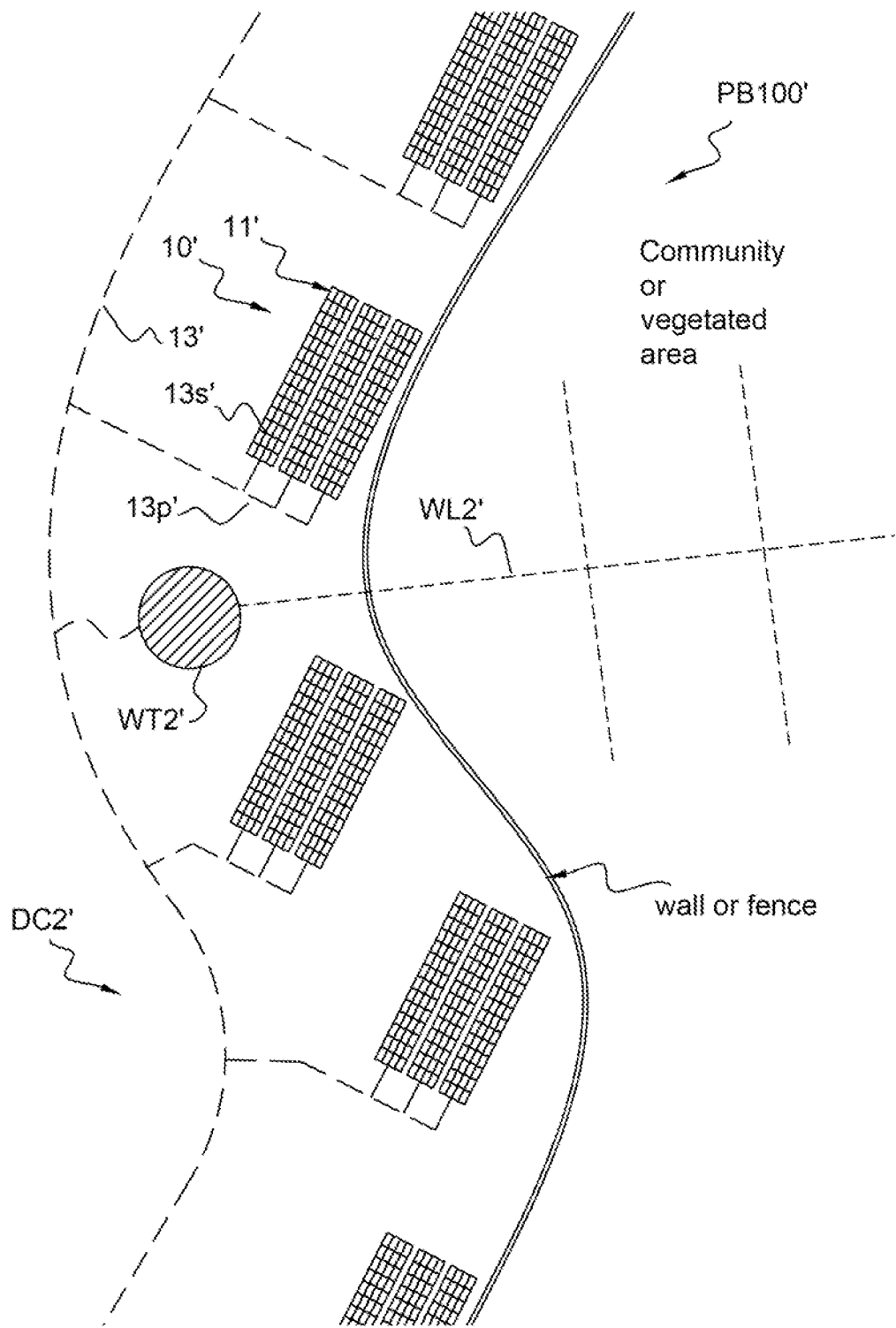
FIG. 29: Site plan of one embodiment of the invention

FIG. 16*a* discloses an embodiment of the present invention in which wind-resistant photovoltaic modules 10' can be for example, less than 54" in height. Photovoltaic modules 10' consist essentially of perforated panels W1' structurally connected together forming hollow structural enclosure EN1' which supports solar panels 11' by using structural frames F1'. Perforated panels W1' can be made of metal, reinforced plastic or another rigid material. Perforated panels W1' consist of apertures A1' to allow for natural ventilation under solar panels 11'. Photovoltaic modules 10' comprise gutter G1 with drain DR2' or an opening on the lower end of solar panels 11' to direct rainwater in a predetermined direction. A plurality of ballast blocks BL1' are filled within hollow structural enclosures EN1' to act as weights against wind loads to hold photovoltaic modules 10' in place. Ballast blocks BL1' can be construction waste or premanufactured concrete blocks having predetermined recycled construction waste content; the objective is to enable recycling of waste materials. Ballast blocks BL1' are preferably water absorbing type to allow detention of rainwater. Rainwater is directed from solar panels 11' with gutter G1' and drain DR2' over ballast blocks BL1' which absorb rainwater to enable detention of rainwater for a predetermined period of time. Optionally reflective panels RP1' can be provided between photovoltaic modules 10' to redirect sunlight on the adjacent solar panels 11' as shown by dashed lines and arrows on FIG. 16*b*. Reflective panels RP1' also aid in reduction in wind loads on photovoltaic modules 10' by forming an enclosure. Embodiments shown in FIGS. 16*a* and 16*b* can also be configured as part of the photovoltaic power bank system PB100' (FIGS. 28*a*, 28*b*, 29).

FIG. 16*b* discloses an embodiment of the invention which is similar to embodiment shown in 16*a* with a few differences: Walls W1' are comprised of structural frames F1'. It comprises water tank WT1' under solar arrays 11' which can also be filled with ballast BL1'. Water tank WT1' is fitted with drain valve DV1' to control the flow of water from the water tank.

FIGS. 17, 18*a*, 18*b*, 18*c* disclose an embodiment of the present invention in which wind-resistant photovoltaic modules 10' consist essentially of structural frames F1' and structural enclosures EN1' supporting a plurality of solar panels facing a sunward direction. In one embodiment of the invention structural enclosures EN1' and structural frames F1' are secured to a building element such as a parapet by using outrigger system OR1'. Outrigger system OR1' is comprised of a plurality of structural frames F1' connected to a building element with structural anchors AN1' along the perimeter. Structural frames F1' can also be attached to a structural column extending above the roof with structural anchors AN1' (FIG. 18*c*). Structural frames F1' are comprised of water channels WC1' underneath to enable drainage of rainwater at the roof surface. Ballast BL2' blocks can be used to further enable protection from wind uplifts. Plurality of photovoltaic modules 10' are connected together and are substantially enclosed from all sides and top to enable at least 10% reduction in wind loads that would otherwise be imposed on the solar panels 11' if exposed to the same wind conditions. Reflective panels RP1' are preferably removable to enable access to switchgear or electric circuits of solar panels which are substantially concealed within photovoltaic modules 10'.

Figure 19A:
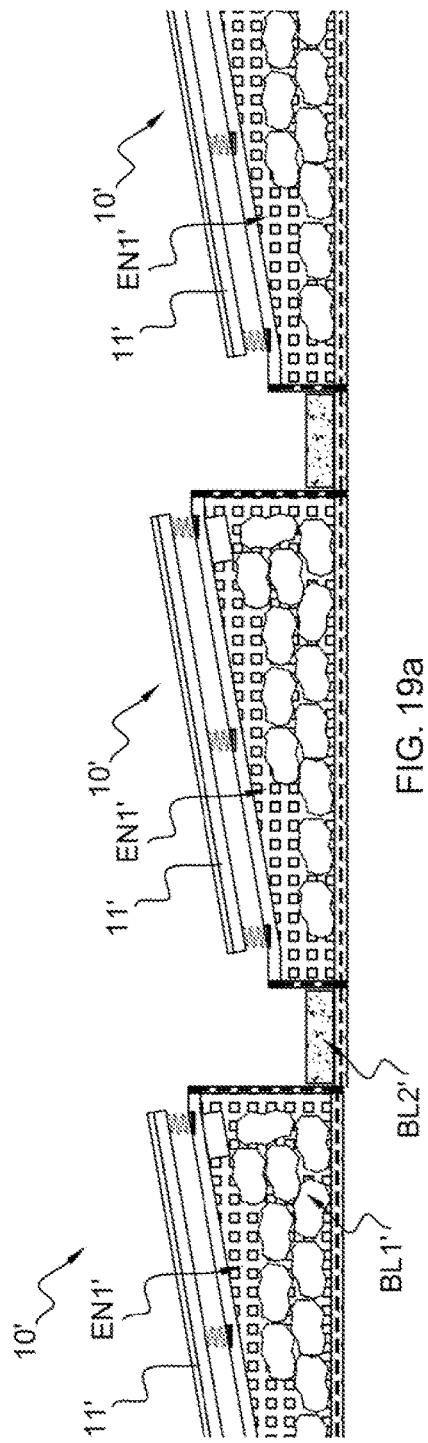
FIG. 19a: Sectional view of one embodiment of the invention
Figure 19B:
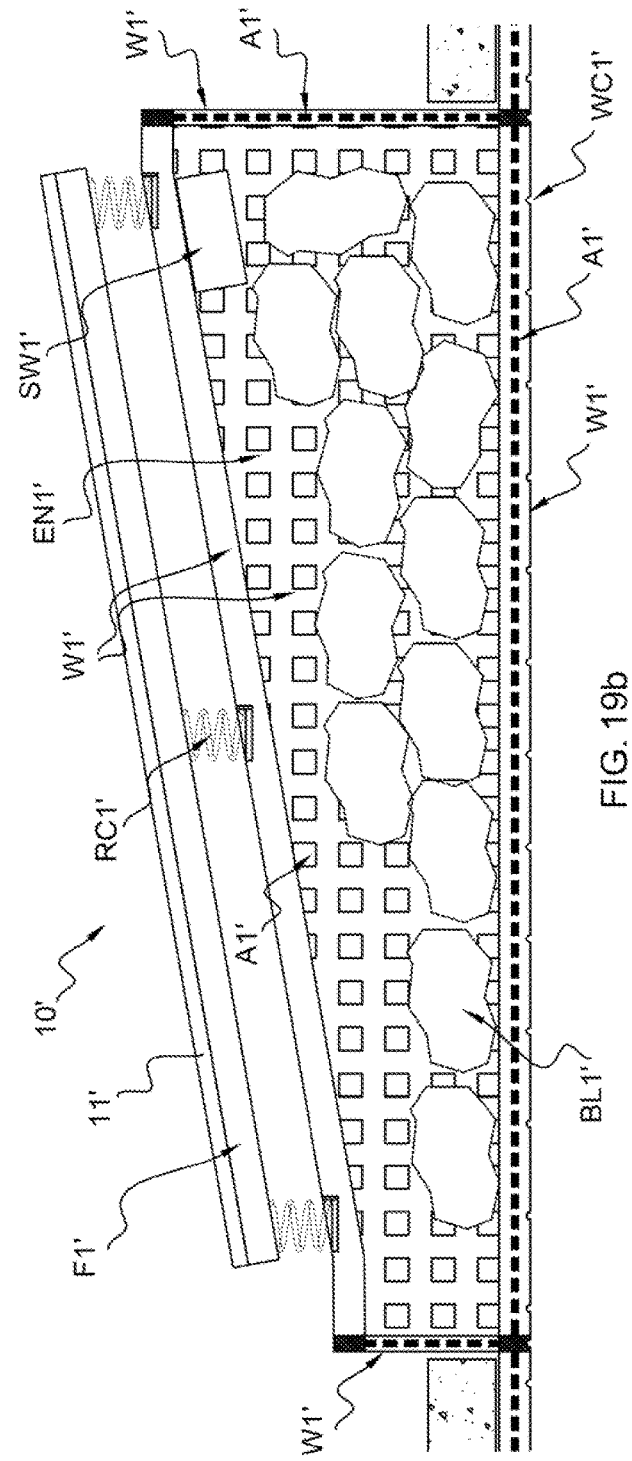
FIG. 19b: Sectional view of one embodiment of the invention

FIGS. 19*a*, 19*b* disclose an embodiment of the present invention in which wind-resistant photovoltaic modules 10' are comprised of solar panels 11' supported over structural enclosures EN1' and perforated rigid panels W1' with resilient connections RC1'. The resilient connections can be, for example, bent resilient strips or springs. The resilient strips have a predetermined shape configured to flex under structural stresses and return to their shape when the stress is released similar to springs. The aforementioned method and system is used to minimize wind loads on solar panels particularly during storms. When solar panels are subjected to heavy winds, they move and flex along with structural frames F1' to deflect wind rather than directly encountering its loads. This configuration reduces overall wind uplift forces on wind-resistant photovoltaic modules 10' thereby reducing the weight requirements of ballast BL1', BL2' which is a critical factor on roofing structural design to reduce dead loads.

Figure 20:
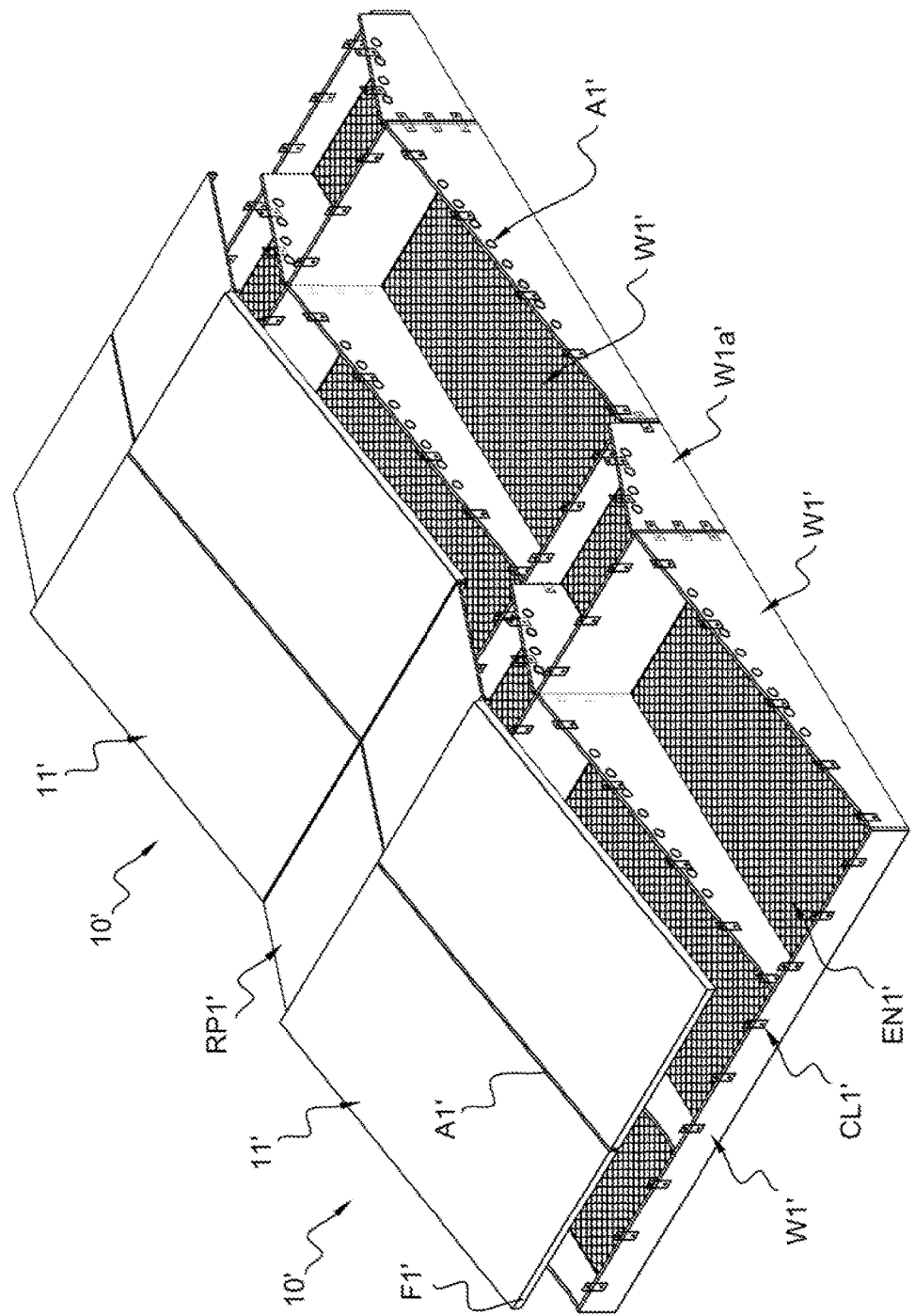
FIG. 20: 3D view of one embodiment of the invention

FIG. 20 discloses an embodiment of the present invention in which wind-resistant photovoltaic modules 10' are comprised of solar panels 11' supported over structural enclosures EN1'. Structural enclosures EN1' consist essentially of rigid panels or perforated rigid panels W1' joined together with structural connectors or clips CL1'. Solar panels 11' having structural frames F1' are mounted over structural enclosures EN1' by using structural clips CL1'. Enclosures EN1' are substantially enclosed from all sides with rigid panels W1' and W1a'. Rigid panels W1a' are preferably removable panels to enable service access to switchgear located within enclosures EN1'. Wind-resistant photovoltaic modules 10' are substantially enclosed from top with solar panels 11' and removable reflective panels RP1'. A plurality of apertures are formed between rigid walls W1' and between the joints of solar panels 11' to allow for natural ventilation for heat dissipation as well as they contribute toward reduction of wind loads. Rigid panels W1' are preferably modular units which can be readily put together in field by using structural clips. Enclosures EN1' are configured to hold ballast or rainwater tanks. Water channels are formed underneath the enclosures to allow for drainage of rainwater underneath the enclosure walls.

Figure 21A:
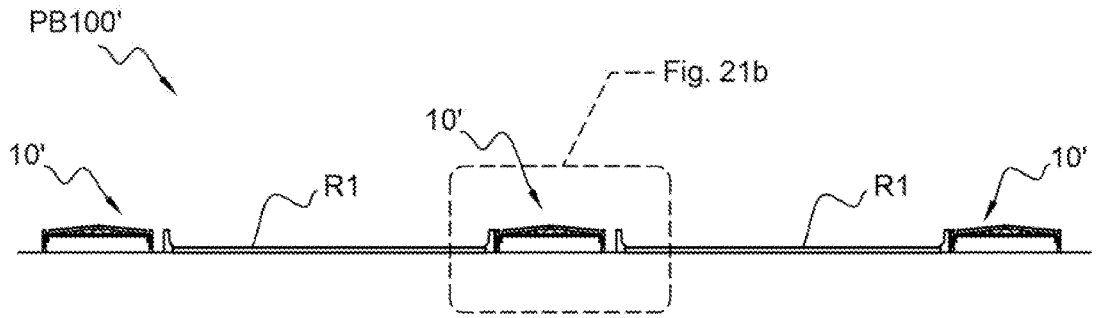
FIG. 21a: Sectional view of one embodiment of the invention
Figure 21B:
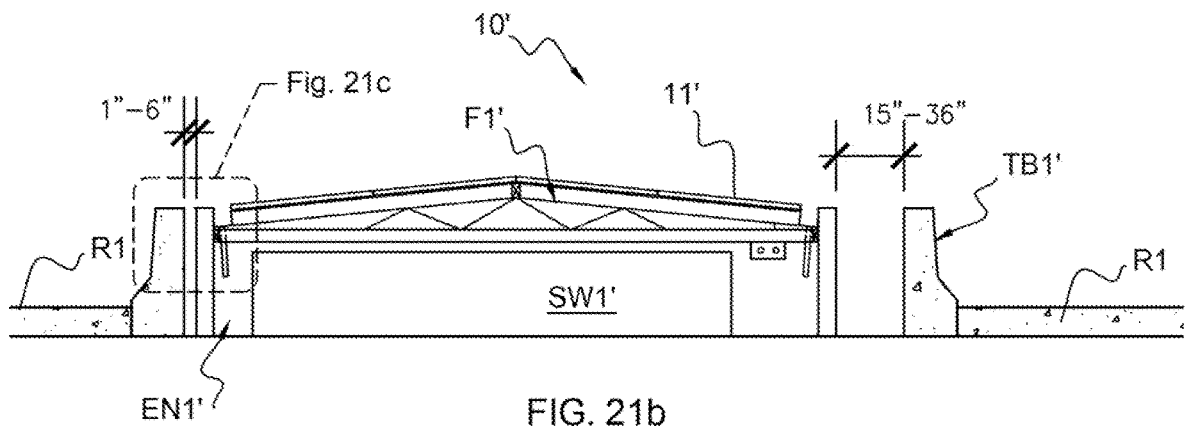
FIG. 21b: Sectional view of one embodiment of the invention
Figure 21C:
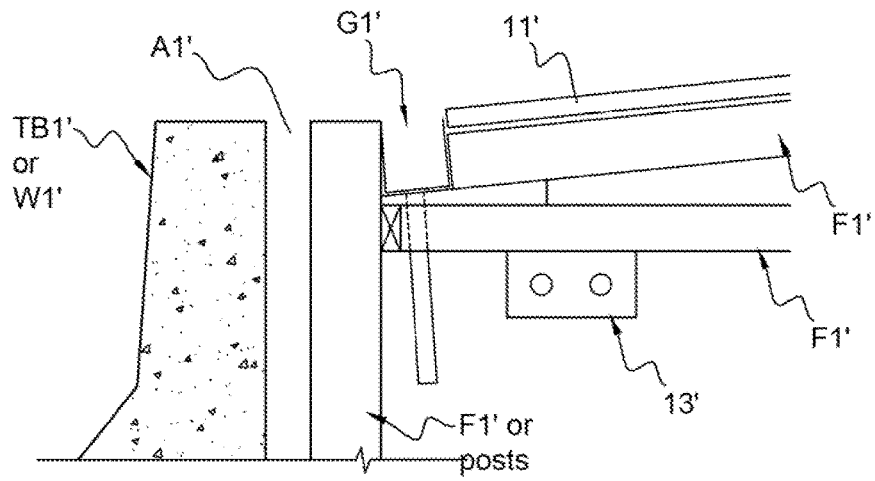
FIG. 21c: Sectional view of one embodiment of the invention
Figure 22A:
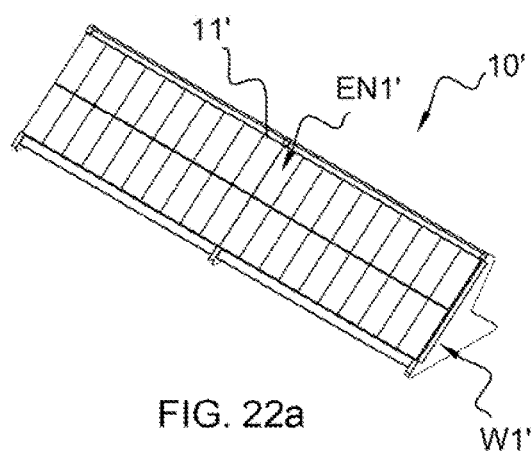
FIG. 22a: 3D view of one embodiment of the invention
Figure 22B:
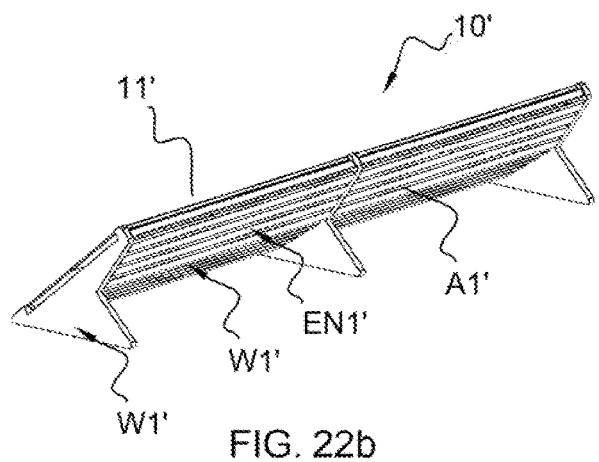
FIG. 22b: 3D view of one embodiment of the invention
Figure 22C:
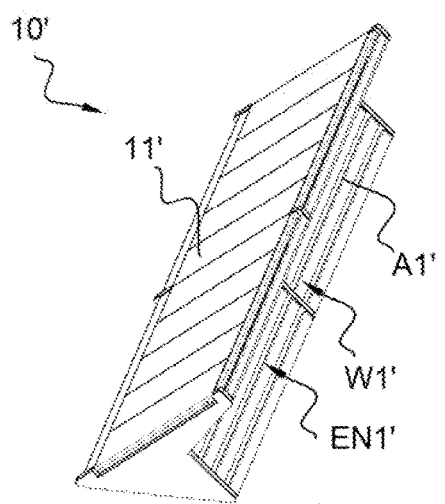
FIG. 22c: 3D view of one embodiment of the invention
Figure 22D:
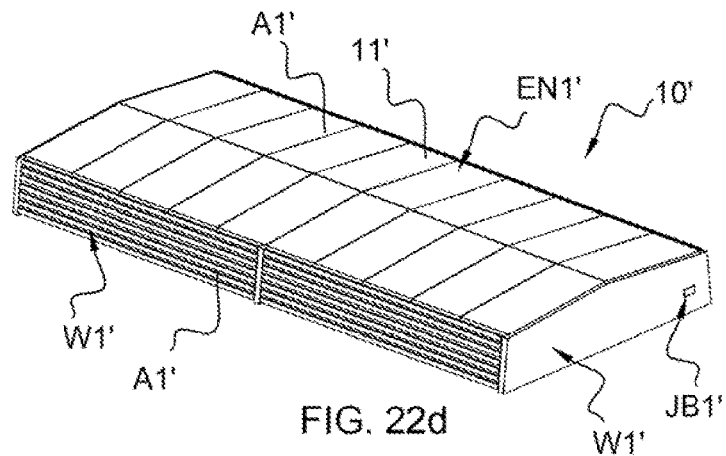
FIG. 22d: 3D view of one embodiment of the invention
Figure 22E:
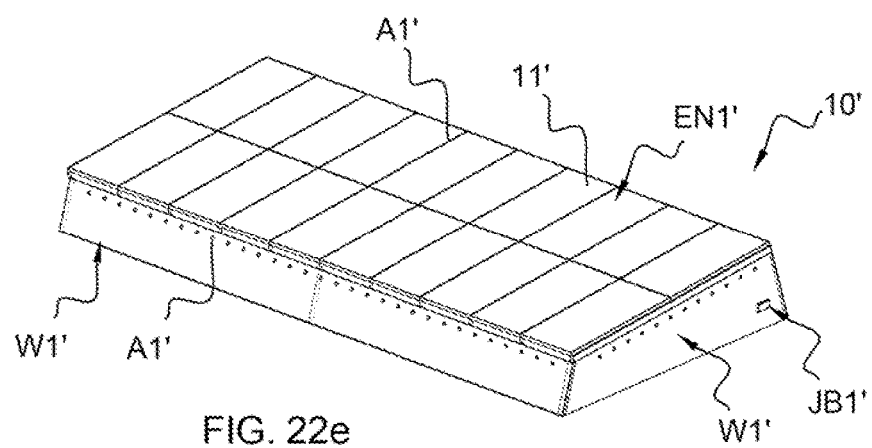
FIG. 22e: 3D view of one embodiment of the invention

FIGS. 21a, 21b, 21c disclose an embodiment of the present invention showing sectional views of wind-resistant photovoltaic modules 10' as part of photovoltaic power bank system PB100'. Wind-resistant photovoltaic modules 10' are comprised of a hollow structural enclosures EN1' formed by a plurality of structural frames F1' or posts supporting solar panels 11'. Structural frames F1' can be trusses spanning between posts. Photovoltaic structures 10' are separated from traffic barriers TB1' from about 1"-36" forming structural isolation and apertures between them. However traffic barriers TB1' do act as wind barriers to minimize wind loads on solar panels 11'. This dual functionality of traffic barriers is novel that can reduce wind loads by at least 10%.

FIGS. 22a-22e disclose embodiments of the present invention showing 3D views of portable wind-resistant photovoltaic modules 10' which can be installed as standalone units or electrically daisy chained as part of an energy generation system. Wind-resistant photovoltaic modules 10' consist essentially of hollow structural enclosures EN1' made of walls, rigid panels, louvers, grills, perforated panels W1' and structural frames F1' supporting a plurality of solar panels 11' facing one or more sunward directions. Walls W1' and solar panels consist of apertures A1' to allow for natural ventilation behind solar panels 11'. Photovoltaic modules 10' are configured to reduce wind loads on solar panels 11' by at least 10% when compared to without enclosures EN1'. Photovoltaic modules 10' are configured to substantially conceal electrical circuits and switchgear. Photovoltaic modules 10' are plug-an-pay units which can be quickly set up by individuals for energy production and use. Photovoltaic modules 10' comprise electrical plugs or junction boxes JB1' that can be used for hardwired connections or plug-and-play connections between one photovoltaic module 10' and another to form bigger electrical capacity energy generation systems.

Figure 23A:
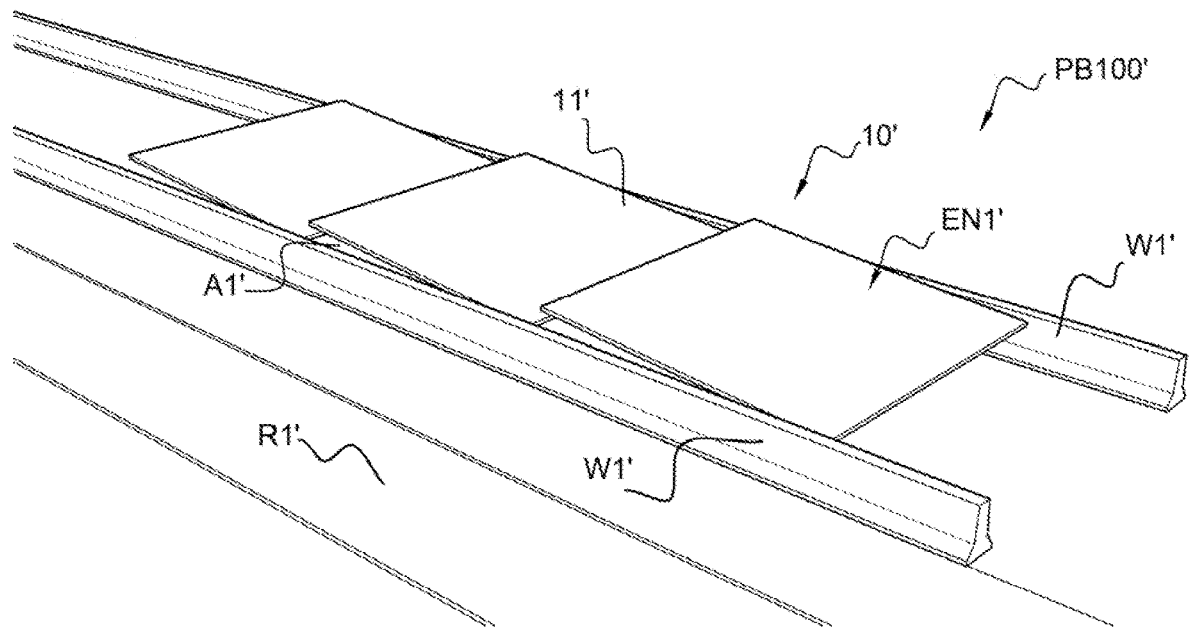
FIG. 23a: 3D view of one embodiment of the invention
Figure 23B:
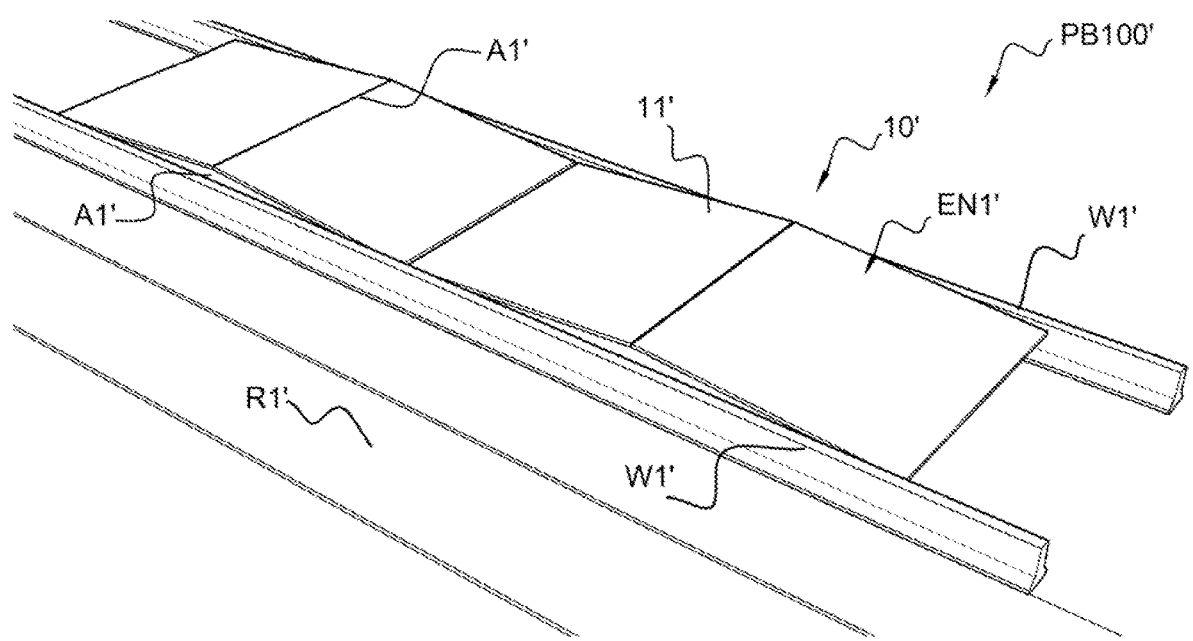
FIG. 23b: 3D view of one embodiment of the invention
Figure 24A:
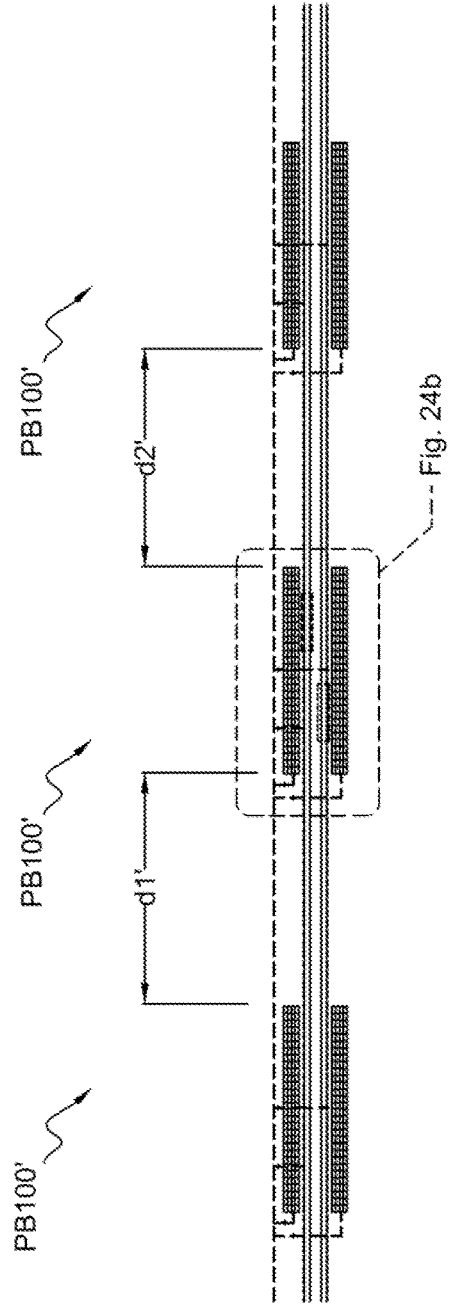
FIG. 24a: Plan view of one embodiment of the invention
Figure 24B:
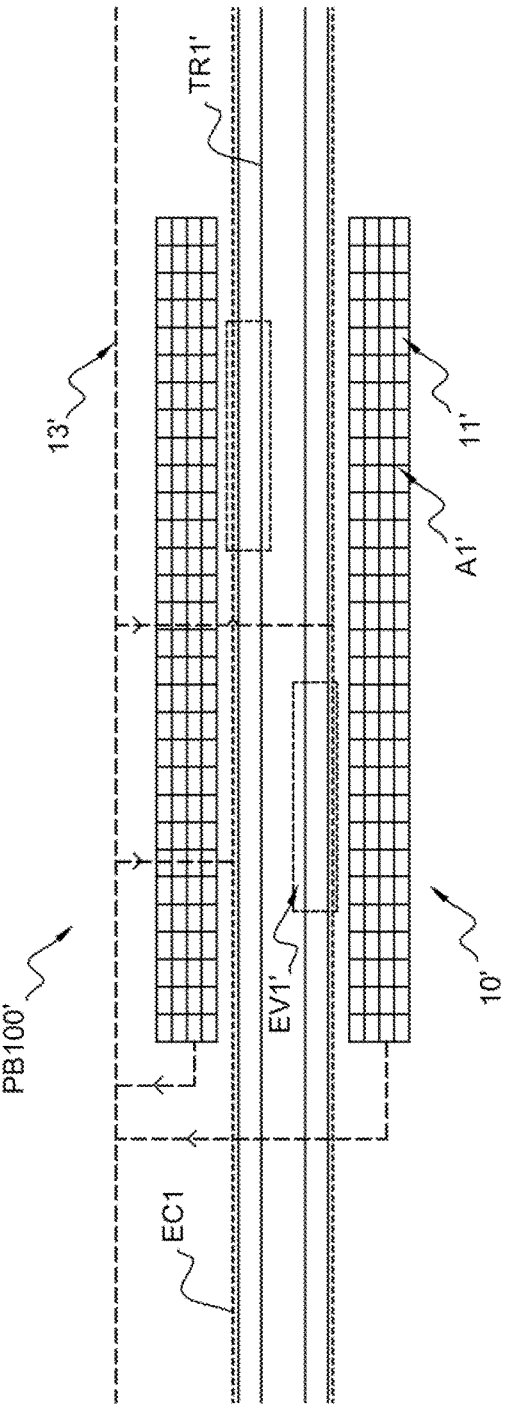
FIG. 24b: Plan view of one embodiment of the invention
Figure 25:
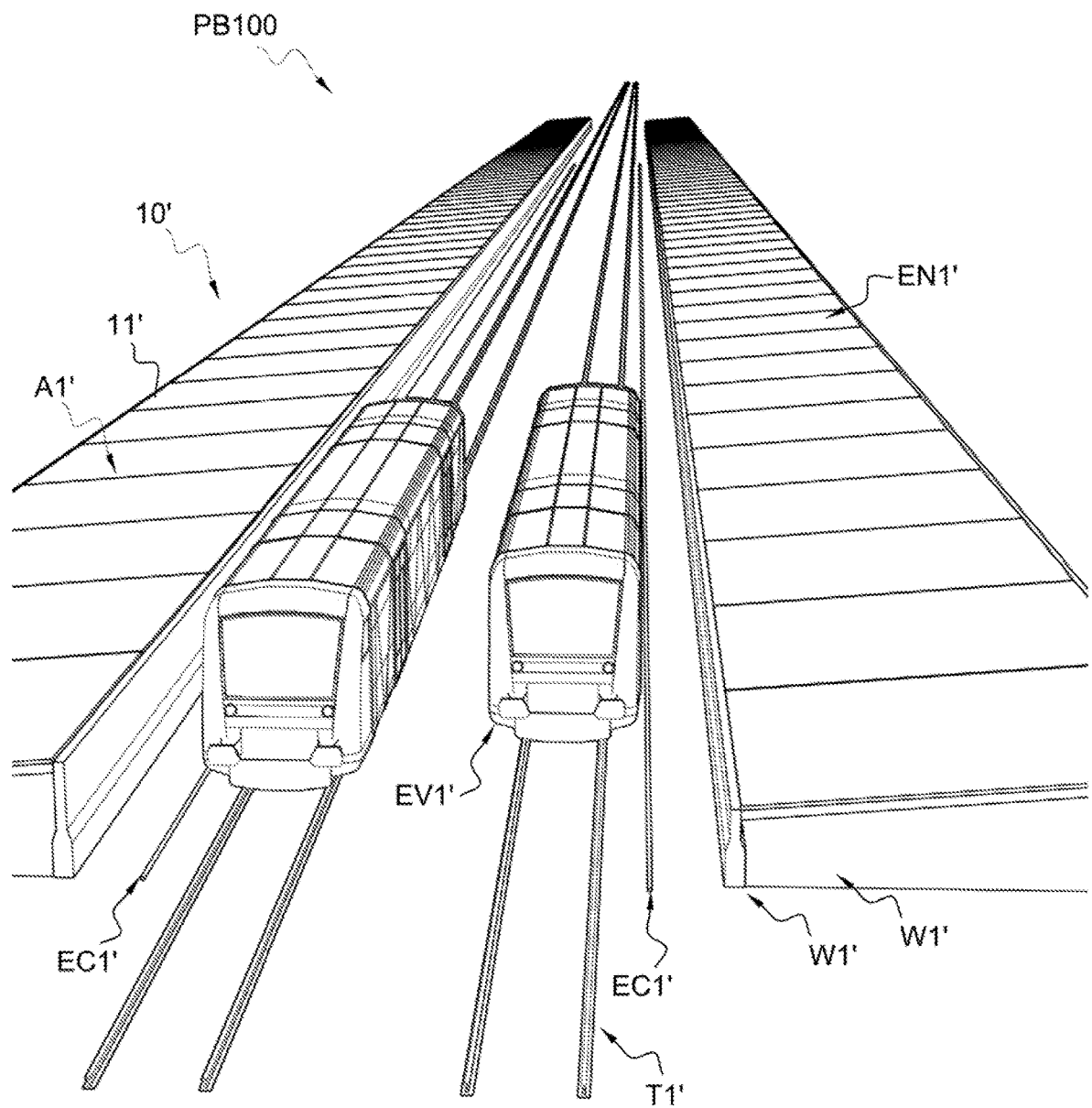
FIG. 25: 3D view of one embodiment of the invention
Figure 26A:
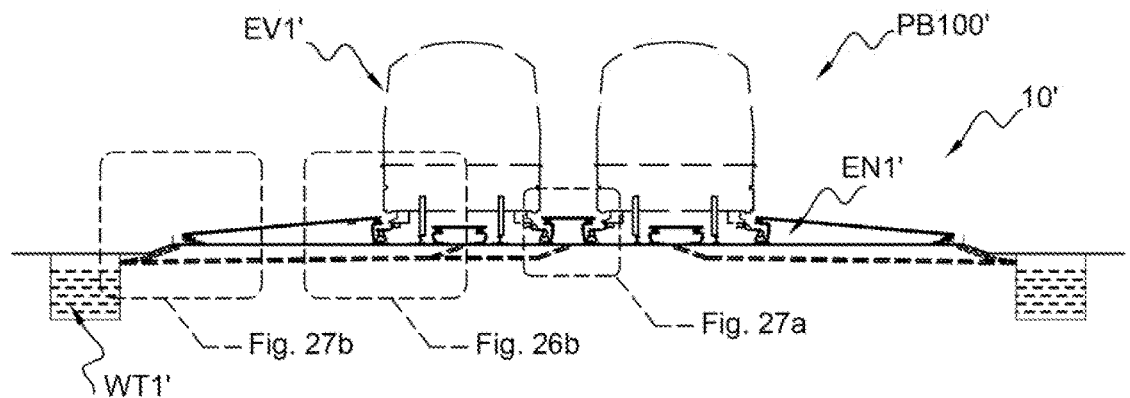
FIG. 26a: Sectional view of one embodiment of the invention
Figure 26B:
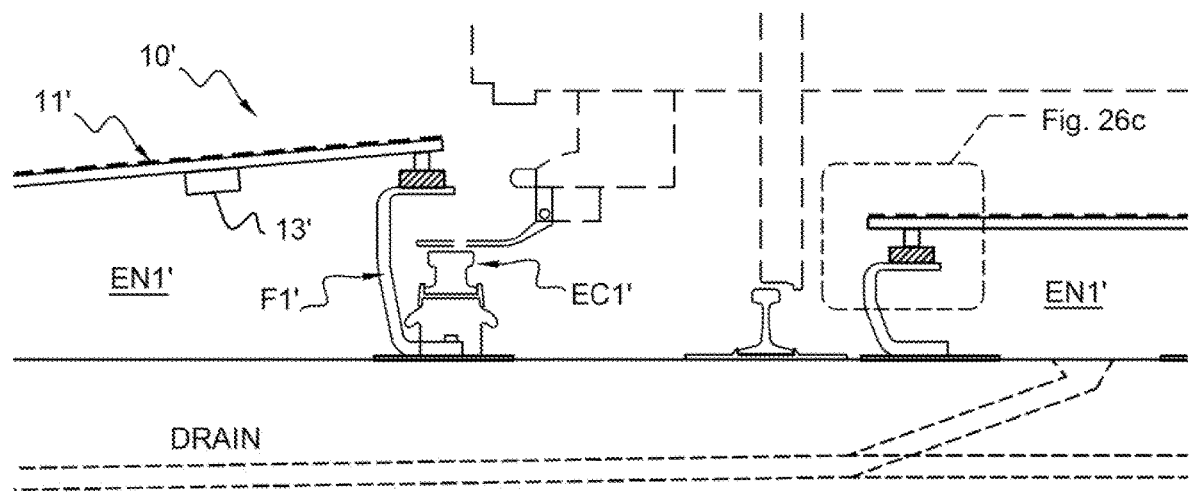
FIG. 26b: Sectional view of one embodiment of the invention
Figure 26C:
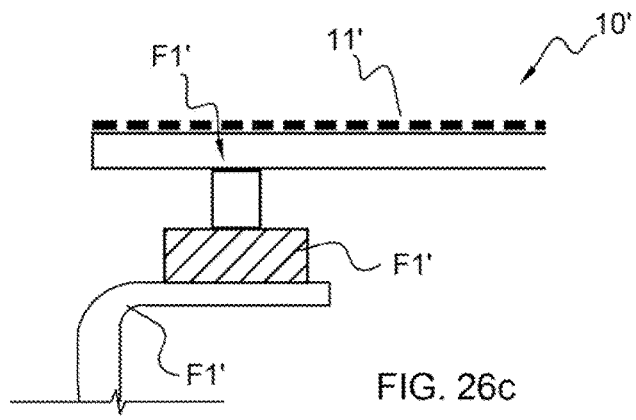
FIG. 26c: Sectional view of one embodiment of the invention
Figure 27A:
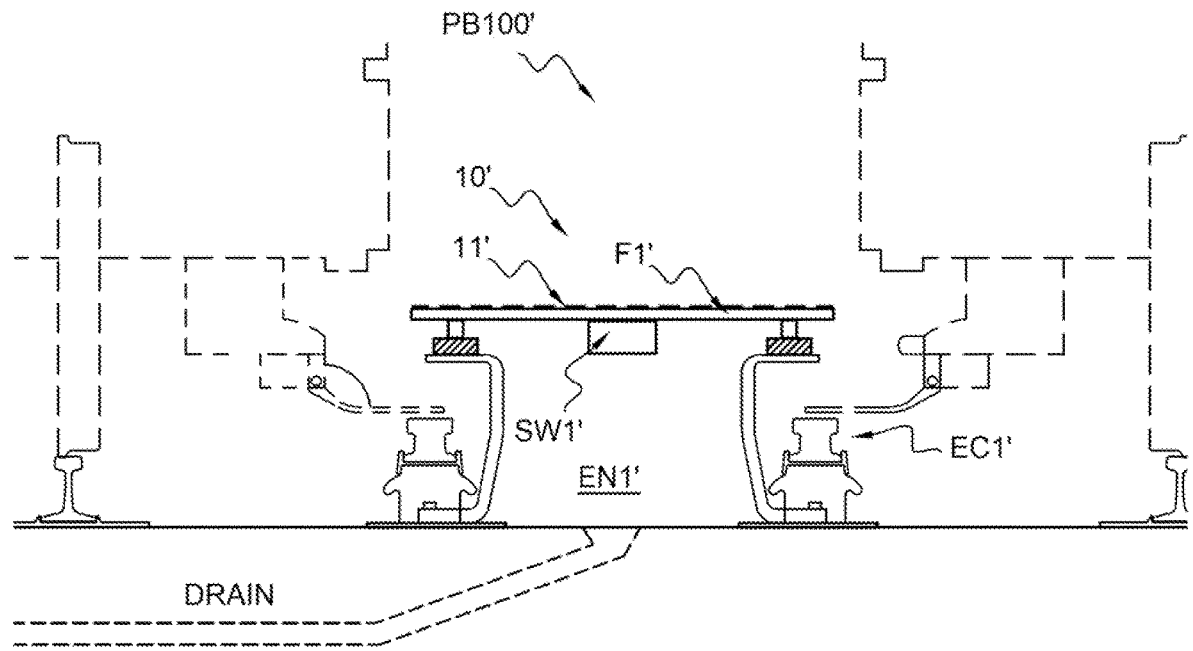
FIG. 27a: Sectional view of one embodiment of the invention
Figure 27B:
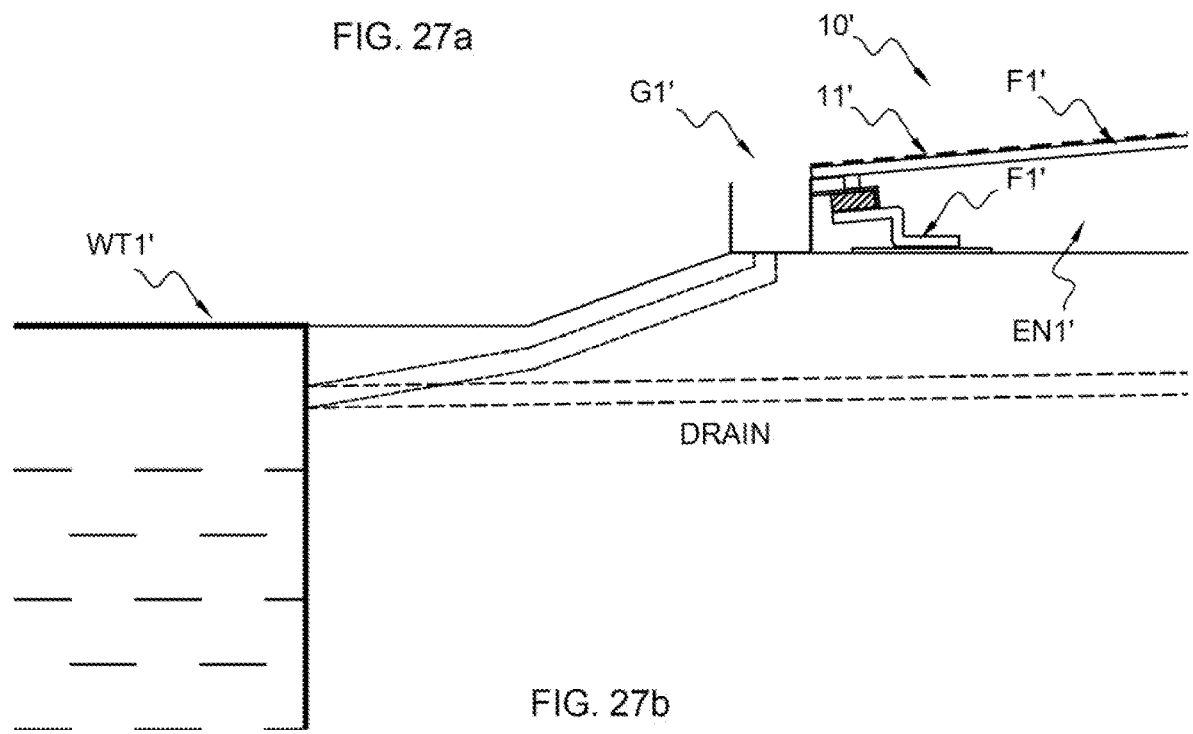
FIG. 27b: Sectional view of one embodiment of the invention

FIGS. 23a-23b disclose embodiments of the present invention showing 3D views. Solar arrays 11' are supported by traffic barriers walls W1' inclining in the orthogonal direction from the direction of road R1. This enables installation of photovoltaic modules 10' for the roads running in the N-S or other directions for maximizing solar gains for solar arrays 11'.

FIGS. 24a-27b disclose embodiments of the present invention showing a plurality of photovoltaic power banks PB100' installed along train tracks TR1' to power electric vehicles EV1'. A plurality of power banks PB100' are installed spaced by predetermined distances d1', d2' to electrically power electric conductors EC1' such as a third rail to power electric vehicles EV1' while in motion. As photovoltaic modules 10' are installed in close proximity to train tracks, electric transmission losses are minimized. Sections shown in FIGS. 26a-27b illustrate how photovoltaic modules 10' can utilize spaces along train tracks as well as spaces within the train tracks to maximize land use. Enclosures EN1' are configured to conceal most of the electrical transmission lines and switchgear SW1' for weather protection and public safety. Photovoltaic modules 10' are configured to drain rainwater into water storage tanks WT1' by using gutters G1'.

FIGS. 28a, 28b, 29 disclose embodiments of the present showing exemplary configurations of photovoltaic energy generation system (photovoltaic power bank) PB100'. Wind-resistant photovoltaic modules 10' are placed along a curvilinear boundary and are electrically connected together by using electrical daisy chains DC1', DC2'. FIG. 28a illustrates solar panels 11' being first connected with series electrical circuits 13s', and then they are connected to electric transmission line 13' by using parallel electrical circuits 13p'. FIG. 28b illustrates pairs of photovoltaic modules 10' being first connected with series circuits 13s' and then connected to transmission line 13' in parallel configuration by using circuits 13p'.

FIG. 29 discloses an embodiment of the present showing exemplary configurations of photovoltaic energy generation system (photovoltaic power bank) PB100'. A plurality of wind-resistant photovoltaic modules 10' illustrated in various figures of the present invention can be grouped together in different arrangements. A group of solar panels 11' are electrically connected together by using series circuits 13s', and then they are connected to main electric transmission line 13' by using parallel configurations with circuits 13p'. Electricity produced by solar arrays 11' is used to pump water into overhead storage tank WT2'. The water in the storage tank is used for irrigation or community needs by using water lines WL2'.

FIGS. 30a, 30b, 30c disclose an embodiment of the present invention which protects photovoltaic modules 10' with external resilient guardrail system GR1' against vehicular impacts on walls W1' or traffic barriers. Resilient guardrail system GR1' consists essentially of resilient 'U' shaped metallic or synthetic composite bars GR1a attached to traffic barriers or walls W1' at predetermined intervals. GR1b is a continuous crash protection board attached to the other arm of the 'U' shaped bar with attachment housing GR1c. Crash board GR1b can be made of metal, a sythetic composite or a combination thereof to withstand vehicular impacts. Attachment housing GR1c can be a rigid metallic connector or a shock absorption connector made of resilient metal, sythetic rubber components, or a combination thereof. During an impact on crash protection board GR1b, resilient 'U' shaped bars flex in the X3' direction as shown with dashed arrow (FIG. 30b) thereby preventing or minimizing damage to solar panels 11'. Resilient guardrail system GR1' can be a substitution of structural isolation system ST1' or can work in conjunction with it to further protect solar panels 11'.

Wind-resistant photovoltaic modules 10' are comprised of hollow structural enclosures EN1' which support solar panels 11'. Hollow structural enclosures EN1 are comprised of a plurality of walls, rigid panels, louvers, grills or perforated panels W1' and structural frames F1'. The hollow structural enclosures EN1' are configured to conceal electrical switchgear such as joiner boxes, electric controllers, micro inverters, transmission lines, etc. for weather protection and public safety. Wind-resistant photovoltaic modules 10' are comprised of a plurality of apertures A1' configured to provide ventilation at the rate of at least 0.01 air changes per hour within the hollow structural enclosures enabling heat dissipation produced by the solar panels. Or the combined area of the apertures is at least 0.1% of the overall surface area of the photovoltaic modules 10' to provide natural ventilation for heat dissipation. The wind-resistant photovoltaic modules 10' are configured to reduce wind loads on the solar panels 11' by at least 10% when compared to same wind loads imposed on the solar panels without the walls, rigid panels, louvers, grills, perforated panels and apertures. The walls or rigid panels 10' can be made of fiber reinforced plastic, metal or synthetic composites with metallic lining facing the exterior of the enclosures for UV protection. Wind-resistant photovoltaic modules 10' are configured to electrically connect to an off-grid electrical system, a grid-tied electrical system, a Distributed Energy Resource (DER) or a microgrid to transmit electricity produced by the solar panels. The inclination and arrangement of solar panels 11' as shown in figures are exemplary; other orientations of solar arrays 11' are within the scope of the present invention.

The embodiments of the present invention as described herein are for examples only; they should not be used in a limiting sense to interpret the scope of the present invention. Any modifications made to the assemblies, sub-assemblies and systems disclosed herein utilizing the means, methods, and principles of the present invention are within the scope of the present invention. By using the teaching of the present invention, different embodiments of the present invention can be combined to make additional embodiments.

The invention claimed is:

1. A wind-resistant photovoltaic energy generation system, consisting essentially of:
   a plurality of elongated and enclosed photovoltaic structures less than 5'-6" high forming a barrier along a transportation route or a boundary;
   each of said elongated and enclosed photovoltaic structures consists of a photovoltaic top made only of a plurality of solar panels and structural frames facing one or more sunward directions supported by a hollow structural enclosure consisting essentially of a plurality of rigid walls;
   said elongated and enclosed photovoltaic structures comprise a plurality of apertures about $1/16$"-4" wide formed within said rigid walls, in between said rigid walls and said solar panels, or a combination thereof, configured to enable atmospheric pressure equalization and natural ventilation within said elongated and enclosed photovoltaic structures;
   said elongated and enclosed photovoltaic structures house and protect at least a portion of electric switchgear of said solar panels configured to transmit electricity produced by said solar panels by at least one electric transmission line placed along said transmission route or said boundary by using at least one of the following systems: an off-grid electrical system, a grid-tied electrical system, a Distributed Energy Resource (DER) and a microgrid;
   wherein said solar panels are mounted to said structural frames supported by said rigid walls, and wherein said rigid walls substantially enclose said photovoltaic top from all sides to block at least a portion of winds from directly hitting an underside of said solar panels, thereby reducing wind loads on said solar panels and said structural frames.

2. The wind-resistant photovoltaic energy generation system of claim 1, wherein said elongated and enclosed photovoltaic structures further consists essentially of one or more gutters and rainwater collection tanks, and wherein said solar panels are sloped to divert rainwater fallen on said solar panels into said rainwater collection tank(s) by using said gutter(s).

3. The wind-resistant photovoltaic energy generation system of claim 1, wherein at least one of said rigid walls is a traffic barrier.

4. The wind-resistant photovoltaic energy generation system of claim 1, wherein said solar panels are protected from vehicular impacts by a plurality of structural isolation joints placed in between said rigid walls and said structural frames supporting said solar panels.

5. A wind-resistant photovoltaic energy generation system, consisting essentially of:
   one or more rows of interconnected enclosed photovoltaic modules less than 5"-6" high forming a solar array;
   each of said enclosed photovoltaic modules consists of a photovoltaic top made only of a plurality of solar panels and structural frames facing one or more sunward directions supported by a hollow structural enclosure consisting essentially of a plurality of rigid walls;
   said enclosed photovoltaic modules comprise a plurality of apertures about $1/16$"-4" wide formed within said rigid walls, in between said solar panels and said rigid walls and said solar panels, or a combination thereof, configured to enable atmospheric pressure equalization and natural ventilation within said interconnected and enclosed photovoltaic modules;
   said enclosed photovoltaic modules house and protect at least a portion of electric switchgear of said solar panels configured to transmit electricity produced by said solar panels by using at least one of the following systems: an off-grid electrical system, a grid-tied electrical system, a Distributed Energy Resource (DER) and a microgrid;
   wherein said solar panels are mounted to said structural frames supported by said rigid walls, and wherein said rigid walls substantially enclose said photovoltaic top from all sides with said rigid walls to block at least a portion of winds from directly hitting an underside of said photovoltaic top, thereby reducing wind loads on said solar panels and said structural frames.

6. The wind-resistant photovoltaic energy generation system of claim 5, wherein said e rows are structurally interconnected together with a plurality of structural frames and structural connectors forming a structurally stable rectangular solar array.

7. The wind-resistant photovoltaic energy generation system of claim 5, wherein said enclosed photovoltaic modules further consist essentially of one or more rainwater collection tank(s) placed within said hollow structural enclosures, and wherein said solar panels are sloped to divert rainwater fallen on said solar panels into said rainwater collection tank(s).

8. The wind-resistant photovoltaic energy generation system of claim 5, wherein said enclosed photovoltaic modules are self-contained portable units configured to conceal at least a portion of said electrical switchgear within said enclosed photovoltaic modules.

9. The wind-resistant photovoltaic energy generation system of claim 5, wherein said rows are separated by a predetermined space in between, and wherein said space is covered from top with a plurality of inclined reflector panels configured to reflect sunlight in a predetermined direction towards at least one of said solar panels.

10. The wind-resistant photovoltaic energy generation system of claim 5, wherein said hollow structural enclosures contain a predetermined amount of ballast to hold said enclosed photovoltaic modules in place against wind loads.

11. The wind-resistant photovoltaic energy generation system of claim 5, wherein said rigid walls are perforated modular panels joined with a plurality of structural connectors.

12. The wind-resistant photovoltaic energy generation system of claim 5, wherein said solar panels are attached to said structural frames, and said structural frames are attached to said hollow structural enclosures by a plurality of springs or resilient strips.

13. The wind-resistant photovoltaic energy generation system of claim 5, wherein said hollow structural enclosures are held in place against wind loads by attachment to a building element or to ground with structural anchors.

14. The wind-resistant photovoltaic energy generation system of claim 5, wherein at least one of said rigid walls is a traffic barrier.

15. The wind-resistant energy generation system of claim 5, wherein at least one of said hollow structural enclosures further consists essentially of a bottom rigid panel.

16. A wind-resistant photovoltaic energy generation system, consisting essentially of:
- one or more enclosed photovoltaic modules less than 5'-6" high, each consisting of a photovoltaic top made only of a plurality of solar panels and structural frames facing one or more sunward directions supported by a hollow structural enclosure consisting essentially of a plurality of rigid walls;
- each of said enclosed photovoltaic modules comprise a plurality of apertures about $1/16$"-4" wide formed within said rigid walls, in between said solar panels, in between said rigid walls and said solar panels, or a combination thereof, configured to enable atmospheric pressure equalization and natural ventilation within said enclosed photovoltaic modules;
- each of said enclosed photovoltaic modules houses and protects at least a portion of electric switchgear of said solar panels configured to transmit electricity produced by said solar panels by using at least one of the following systems: an off-grid electrical system, a grid-tied electrical system, a Distributed Energy Resource (DER) and a microgrid;
- wherein said solar panels are mounted to said structural frames supported by said rigid walls, and wherein said rigid walls substantially enclose said photovoltaic top from all sides to block at least a portion of winds from directly hitting an underside of said solar panels, thereby reducing wind loads on said solar panels and said structural frames.

17. The wind-resistant photovoltaic energy generation system of claim 16, wherein said enclosed photovoltaic modules are structurally interconnected in a row by using a plurality of structural connectors to form a barrier or an area divider; or said enclosed photovoltaic modules are structurally interconnected in a plurality of rows to form a rectangular solar array.

18. The wind-resistant photovoltaic energy generation system of claim 16, wherein said enclosed photovoltaic module(s) further consist(s) essentially of at least one gutter configured to drain at least a portion of rainwater fallen on said solar panels into a water tank.

19. The wind-resistant photovoltaic energy generation system of claim 16, wherein at least one of said rigid walls is a traffic barrier.

20. The wind-resistant photovoltaic energy generation system of claim 16, wherein a plurality of said enclosed photovoltaic modules are closely spaced along a transportation route in a linear configuration forming a protective barrier.

21. The wind-resistant energy generation system of claim 16, wherein at least one of said hollow structural enclosures further consists essentially of a bottom rigid panel.

22. A wind-resistant photovoltaic energy generation system, consisting essentially of:
- an elongated and enclosed photovoltaic barrier less than 5'-6" high consisting of a photovoltaic top made only of a plurality of solar panels and structural frames facing one or more sunward directions supported by a hollow structural enclosure consisting essentially of a plurality of rigid walls;
- said elongated and enclosed photovoltaic barrier comprises a plurality of apertures about $1/16$"-4" wide formed within said rigid walls, in between said solar panels, in between said rigid walls and said solar panels, or a combination thereof, enabling atmospheric pressure equalization and natural ventilation within said elongated and enclosed photovoltaic barrier;
- said elongated and enclosed photovoltaic barrier houses and protects at least a portion of electric switchgear of said solar panels configured to transmit electricity produced by said solar panels by using at least one of the following systems: an off-grid electrical system, a grid-tied electrical system, a Distributed Energy Resource (DER) and a microgrid;
- wherein said solar panels are mounted to said structural frames supported by said rigid walls, and wherein said rigid walls substantially enclose said photovoltaic top from all sides to block at least a portion of winds from directly hitting an underside of said solar panels thereby reducing wind loads on said solar panels and said structural frames.

23. The photovoltaic energy generation system of claim 22, wherein said elongated and enclosed photovoltaic barrier further consist essentially of one or more gutters configured to divert rainwater fallen on said solar panels into one or more water collection tanks placed within said hollow structural enclosure.

24. The wind-resistant photovoltaic energy generation system of claim 22, wherein at least one of said rigid walls is a traffic barrier.

25. A wind-resistant photovoltaic energy generation system, consisting essentially of:
- a plurality of rows of interconnected enclosed photovoltaic structures less than 5'-6" high forming a rectangular solar array;
- said enclosed photovoltaic structures consist essentially of a plurality of interconnected structural frames supporting a plurality of photovoltaic tops made only of a plurality of solar panels facing one or more sunward directions said enclosed photovoltaic structures enclosed from all sides with a plurality of rigid panels forming one or more hollow structural enclosure(s) underneath said solar panels;
- said enclosed photovoltaic structures comprise a plurality of apertures about $1/16$" to 4" wide formed within said rigid panels, in between said solar panels, in between said rigid panels and said solar panels, or a combination thereof, configured to enable atmospheric pressure equalization and natural ventilation within said interconnected and enclosed photovoltaic structures;
- said enclosed photovoltaic structures house and protect at least a portion of electric switchgear of said solar panels configured to transmit electricity produced by said solar panels by using at least one of the following systems: an off-grid electrical system, a grid-tied electrical system, a Distributed Energy Resource (DER) and a microgrid;

wherein said solar panels are mounted to said structural frames, and wherein said rigid walls substantially enclose said photovoltaic tops from all sides to block at least a portion of winds from directly hitting an underside of said solar panels, thereby reducing wind loads on said solar panels and said structural frames.

26. The wind-resistant photovoltaic energy generation system of claim 25, wherein at hollow structural enclosures are structurally attached to a building element or to ground to secure said enclosed photovoltaic structures against wind uplifts.

27. The wind-resistant photovoltaic energy generation system of claim 25, wherein said solar panels are sloped to divert rainwater fallen on said solar panels into one or more rainwater collection tank(s) placed within said hollow structural enclosures.

28. The wind-resistant photovoltaic energy generation system of claim 25, wherein said hollow structural enclosures contain ballast to hold said enclosed photovoltaic structures in place against wind uplifts.

29. The wind-resistant energy generation system of claim 25, wherein at least one of said hollow structural enclosures further consists essentially of a bottom rigid panel.

* * * * *